United States Patent
Akcasu

(10) Patent No.: US 8,172,529 B2
(45) Date of Patent: May 8, 2012

(54) METHOD OF OPERATION OF A HIGH-EFFICIENCY TURBINE WITH VARIABLE ATTACK ANGLE FOILS

(75) Inventor: Osman Ersed Akcasu, Morgan Hill, CA (US)

(73) Assignee: Lonestar Inventions LP, Austin, TX (US)

( * ) Notice: Subject to any disclaimer, the term of this patent is extended or adjusted under 35 U.S.C. 154(b) by 1297 days.

(21) Appl. No.: 12/017,981

(22) Filed: Jan. 22, 2008

(65) Prior Publication Data

US 2008/0247872 A1     Oct. 9, 2008

Related U.S. Application Data

(63) Continuation-in-part of application No. 11/854,311, filed on Sep. 12, 2007, now Pat. No. 7,918,646.

(60) Provisional application No. 60/886,025, filed on Jan. 22, 2007.

(51) Int. Cl.
*F01D 7/02* (2006.01)

(52) U.S. Cl. .................. 416/1; 416/17; 416/37; 416/40; 416/61; 416/111; 415/1; 415/4.2; 415/4.4; 415/48; 415/60; 415/118

(58) Field of Classification Search ............... 415/1, 2.1, 415/3.1, 4.1, 4.2, 4.4, 48, 60, 118; 416/1, 416/17, 37, 40, 61, 111, 119, 131, 223 R; 290/43, 44, 54, 55
See application file for complete search history.

(56) References Cited

U.S. PATENT DOCUMENTS

| | | | | | |
|---|---|---|---|---|---|
| 3,902,072 | A | * | 8/1975 | Quinn | 290/44 |
| 4,247,251 | A | * | 1/1981 | Wuenscher | 416/24 |
| 4,286,922 | A | * | 9/1981 | Lew | 416/17 |
| 4,303,835 | A | * | 12/1981 | Bair | 290/55 |
| 4,383,801 | A | * | 5/1983 | Pryor | 416/17 |
| 4,410,806 | A | * | 10/1983 | Brulle | 290/44 |
| 5,503,525 | A | * | 4/1996 | Brown et al. | 416/24 |
| 6,379,115 | B1 | * | 4/2002 | Hirai | 416/17 |
| 6,884,020 | B2 | * | 4/2005 | Kaare et al. | 415/1 |

* cited by examiner

*Primary Examiner* — Igor Kershteyn
(74) *Attorney, Agent, or Firm* — Aka Chan LLP

(57) ABSTRACT

Operations of a turbine to generate energy from a relatively slow fluid flow, such as wind and water, are described. The turbine has a plurality of foils rotating about a central axis at a rotational velocity, each of the foils having a length and a foil axis parallel to the length and the central axis with each of the foils rotatable about its foil axis. From determinations of a velocity of the fluid flow, and angular location of each foil and the rotational velocity about the central axis, an attack angle of each foil is controlled with respect to the direction of fluid flow about the foil axis responsive to the velocity of the fluid flow, the angular location of the foil and the rotational velocity as the foil rotates about the central axis.

32 Claims, 18 Drawing Sheets

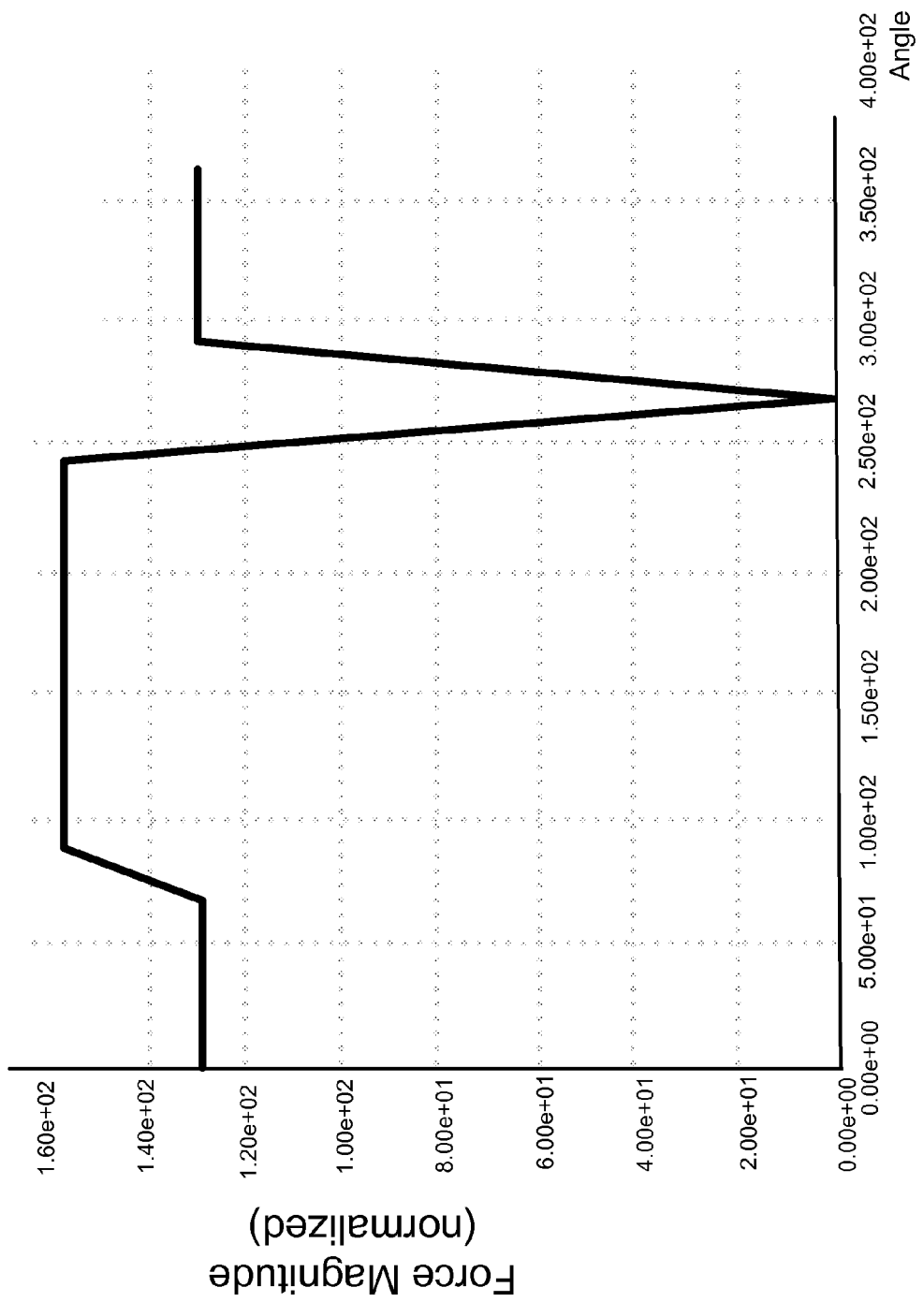

METHOD OF OPERATION OF A HIGH-EFFICIENCY TURBINE WITH VARIABLE ATTACK ANGLE FOILS

CROSS-REFERENCE TO RELATED APPLICATIONS

This patent application is a continuation-in-part of U.S. patent application Ser. No. 11/854,311, filed Sep. 12, 2007, and claims priority from both U.S. patent application Ser. No. 11/854,311 and U.S. Provisional Patent Application No. 60/886,025, filed Jan. 22, 2007, both of which are incorporated by reference for all purposes.

BACKGROUND OF THE INVENTION

The invention is related to the field of turbine design, and especially, to a turbine having foils whose attack angles are varied by computer control for increased efficiency.

Wind and water are energy sources which are widely available, renewable and clean, and the benefits of harnessing wind and water power are manifest. In comparison with the generation of electricity by burning wood, coal, or oil, the increased utilization of wind and water power improves the environment by reducing the emissions of carbon dioxide and other undesirable pollutants which adversely affect air quality and lead to acid rain, the greenhouse effect, and global warming.

Turbines have long been used to harness these energy sources to generate power in the form of electricity or mechanical energy. New turbine designs should therefore be more efficient to provide greater amounts of electricity for a given amount of fluid flow through the turbine. With more efficient turbine designs, the cost of energy generation from wind and water sources decreases. Electricity especially becomes less expensive to generate and more available. Of course, it is desirable that such turbines should be also relatively easy to design, manufacture, install, and maintain.

Wind and water provide slow fluid flows and while the total energy in these flows is large, the "energy density" of a slow flow is small. As a result, a mechanical system should be large to efficiently generate power from these fluid flows. In addition, since the direction of winds and ocean currents can change relatively quickly, a power generation system should be able to respond to these changes rapidly and efficiently. But the requirements of a large structure and the requirements of a mechanical system which can turn or move quickly in response to directional changes are incompatible and may be difficult to achieve.

One turbine design is found in U.S. patent application Ser. No. 11/854,311, filed Sep. 12, 2007 by the present inventor, and entitled, "HIGH EFFICIENCY TURBINE WITH VARIABLE ATTACK ANGLE FOILS," for improvements in the generation of power from fluid energy sources which move slowly, i.e., wind and water sources. The present invention is directed to the operations of the described turbine design.

BRIEF SUMMARY OF THE INVENTION

The present invention in one embodiment provides for a method of operating a turbine to generate energy from a fluid flow. The turbine has a plurality of foils rotating about a central axis at a rotational velocity, each of the foils having a length and a foil axis parallel to the length and the central axis with each of the foils rotatable about its foil axis. The method has the steps of determining a velocity of the fluid flow, and angular location of each foil and the rotational velocity about the central axis; and sequentially controlling an attack angle of each foil with respect to the direction of fluid flow about the foil axis responsive to the velocity of the fluid flow, the angular location of the foil and the rotational velocity as the foil rotates about the central axis.

The present invention in another embodiment provides for a method of operating a turbine to generate energy from a fluid flow. The turbine has a plurality of foils rotating about a central axis at a rotational velocity, each of the foils having a length and a foil axis parallel to the length and the central axis with each of the foils rotatable about its foil axis. The method has the steps of determining a velocity of the fluid flow, and angular location of each foil and the rotational velocity about the central axis; and controlling an attack angle of each foil with respect to the direction of fluid flow about the foil axis responsive to the velocity of the fluid flow, the angular location of the foil and the rotational velocity as the foil rotates about the central axis to maximize a torque by the foil about the central axis in the direction of the rotational velocity.

The present invention in another embodiment provides for a computer for controlling the operations of a turbine to generate energy from a fluid flow. The turbine has a plurality of foils rotating about a central axis at a rotational velocity, each of the foils having a length and a foil axis parallel to the length and the central axis, with each of the foils rotatable about its foil axis. The computer comprises an input pathway receiving input signals indicative of a velocity of the fluid flow, and angular location of each foil and the rotational velocity about the central axis; and an output pathway sending output signals to set an attack angle of each foil with respect to the direction of fluid flow about the foil axis; and at least one processor generating said output signals responsive to the velocity of the fluid flow, the angular location of the foil and the rotational velocity as the foil rotates about the central axis from the input signals. The output signals set the attack angle of each foil to maximize a torque by the foil about the central axis in the direction of the rotational velocity.

The present invention in still another embodiment provides for a computer program for controlling the operations of a turbine to generate energy from a fluid flow. The turbine has a plurality of foils rotating about a central axis at a rotational velocity, each of the foils having a length and a foil axis parallel to the length and the central axis, with each of the foils rotatable about its foil axis and controlled by a computer including at least one processor and memory storing the computer program. The computer program comprises code instructing the at least one processor to accept input signals indicative of a velocity of the fluid flow, and angular location of each foil and the rotational velocity about the central axis; code instructing the at least one processor to process the input signals to determine an attack angle of each foil with respect to the direction of fluid flow about the foil axis from the velocity of the fluid flow, the angular location of the foil and the rotational velocity as the foil rotates about the central axis; and code instructing the at least one processor to send output signals to set the determined attack angle of each foil with respect to the direction of fluid flow about the foil axis. Furthermore, the process and determine code instructs the at least one processor to determine an attack angle of each foil maximizing a torque by the foil about the central axis in the direction of the rotational velocity.

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIGS. 14A-14D are plots of the normalized lift, drag, magnitude of the forces and its moment versus rotational locations of the FIG. 9 foil.

DETAILED DESCRIPTION OF THE INVENTION

The following is a general description of the improved turbine in the above-referenced U.S. patent application Ser. No. 11/854,311, which has been incorporated by reference herein. If desired, further details may be found by referring to that application, though the description below should suffice for the present invention.

Figure 1:
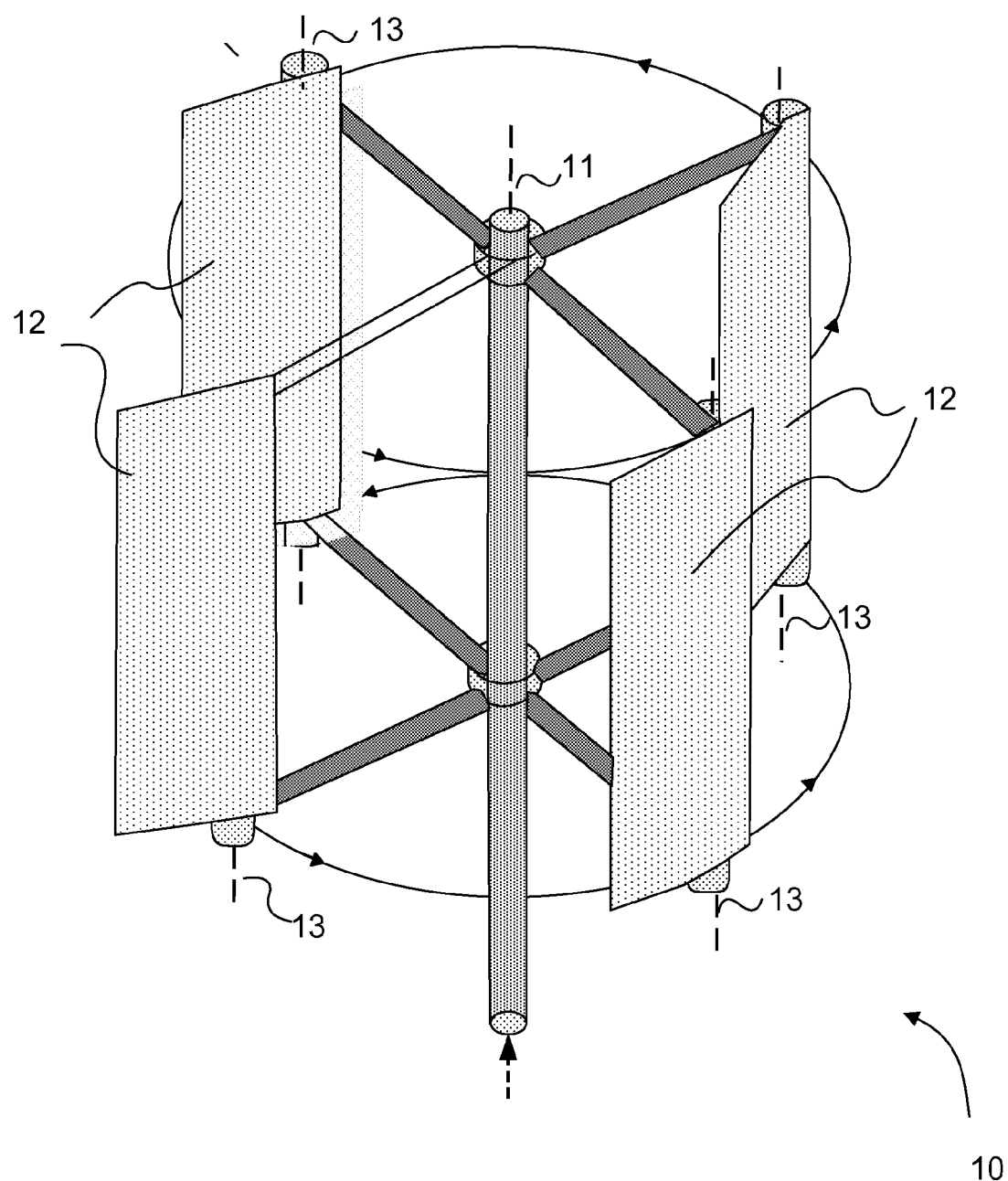
FIG. 1 is a perspective view of a representative turbine according to one embodiment of the present invention.

A general and representative arrangement and operation of an improved turbine according to an embodiment of the present invention is illustrated in FIG. 1. The turbine 10 has the form of a paddlewheel with foils 12 which, under fluid flow, rotate about a central axis 11. In this example, four foils 12 are selected to better show the arrangement and operation of the turbine 10. Each of the foils 12 has an axis 13, parallel to the central axis 11, about which the foil 12 can rotate. In operation, the position of a foil 12 about its axis 13 is controlled by computer and is dependent upon the foil's position about the central axis 11 and the direction of the fluid flow, as explained in detail below.

The operation of the foils in a turbine working in accordance with aspects of the present invention might best be understood by an examination of how a fluid medium, air in this case, operates upon foils in general. The description below assumes that velocity of air is low and it should be understood that the fluid medium can also be a liquid, such as water. Hence the words, foil and airfoil, are sometimes used interchangeably and much of the description of an airfoil is applicable to a foil operating in water.

Figure 2:
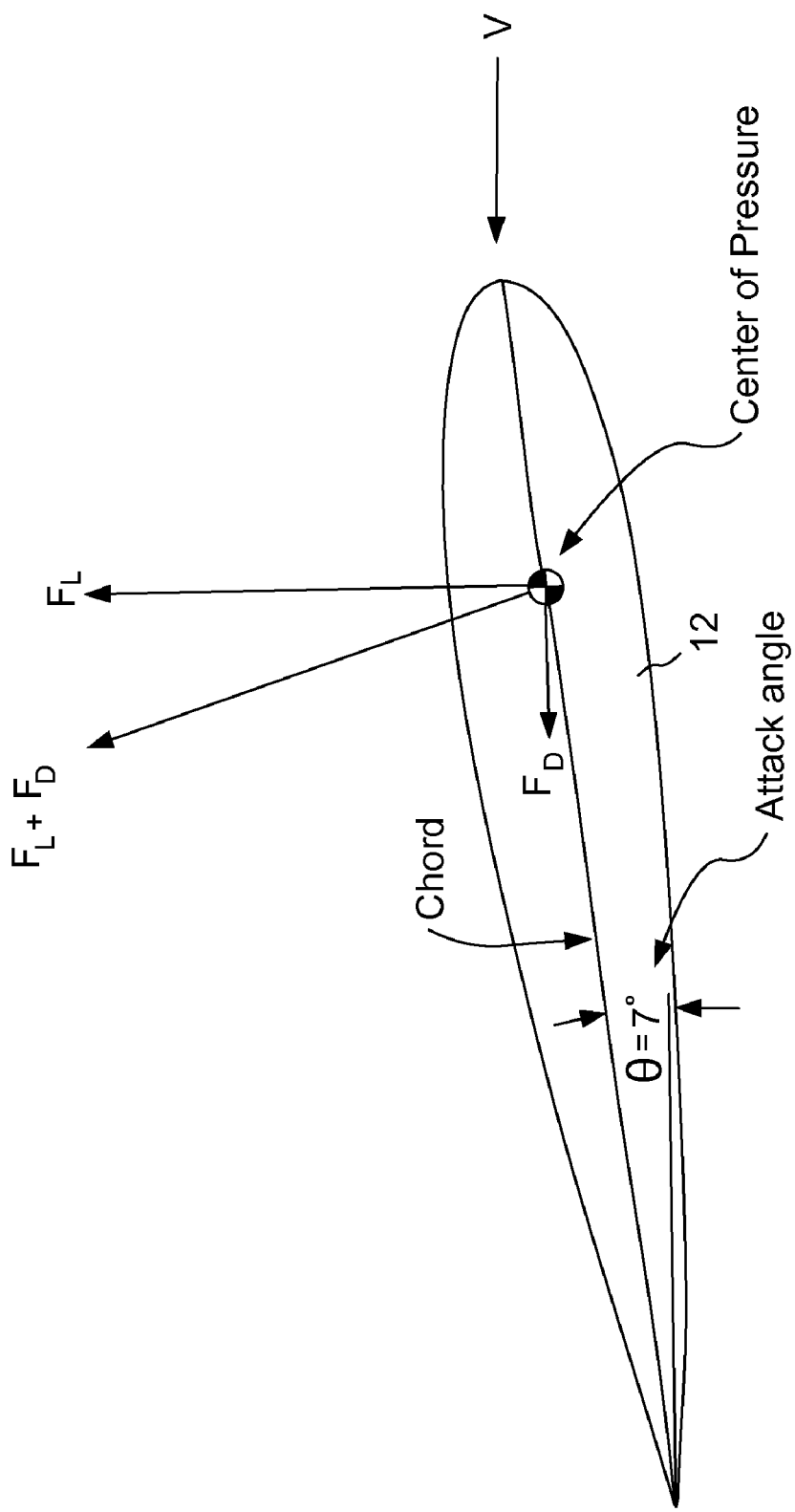
FIG. 2 shows a symmetric foil and the generated lift and drag vectors, center of pressure and the total force vector on the foil as a result of the fluid flow direction from the leading edge to the trailing edge.

The magnitude of the lift and drag forces generated by a foil in a fluid flow is given as:

$$F_L = K_L(\theta)*S*v^2 \quad (1)$$

$$F_D = K_D(\theta)*S*v^2 \quad (2)$$

where $F_L$, $F_D$, $K_L$, $K_D$, $\theta$, S, and v are the lift and drag forces, lift and drag coefficients, attack angle, surface area, and magnitude of the fluid flow velocity respectively. FIG. 2 shows a symmetric airfoil and the generated lift and drag vectors at the center of pressure and the total force vector as a result of the fluid flow direction from the leading edge to the trailing edge. These equations are based on extensive research and experiments since the beginning of the 20$^{th}$ century. See, for example, M. S. Rice, *Handbook of Airfoil Sections for Light Aircraft* (1971); I. H. Abbott and A. E. Von Doenhoff, *Theory of Wing Sections* (1959); B. W. McCormick, *Aerodynamics, Aeoronautics, and Flight Mechanics* (1979). These references along with any other references cited herein are incorporated by reference for all purposes. There are also very widely used proprietary and publicly available computer simulation programs which can determine the forces generated on practically any foil geometry, even in three dimensions, in a fluid flow.

Figure 3:
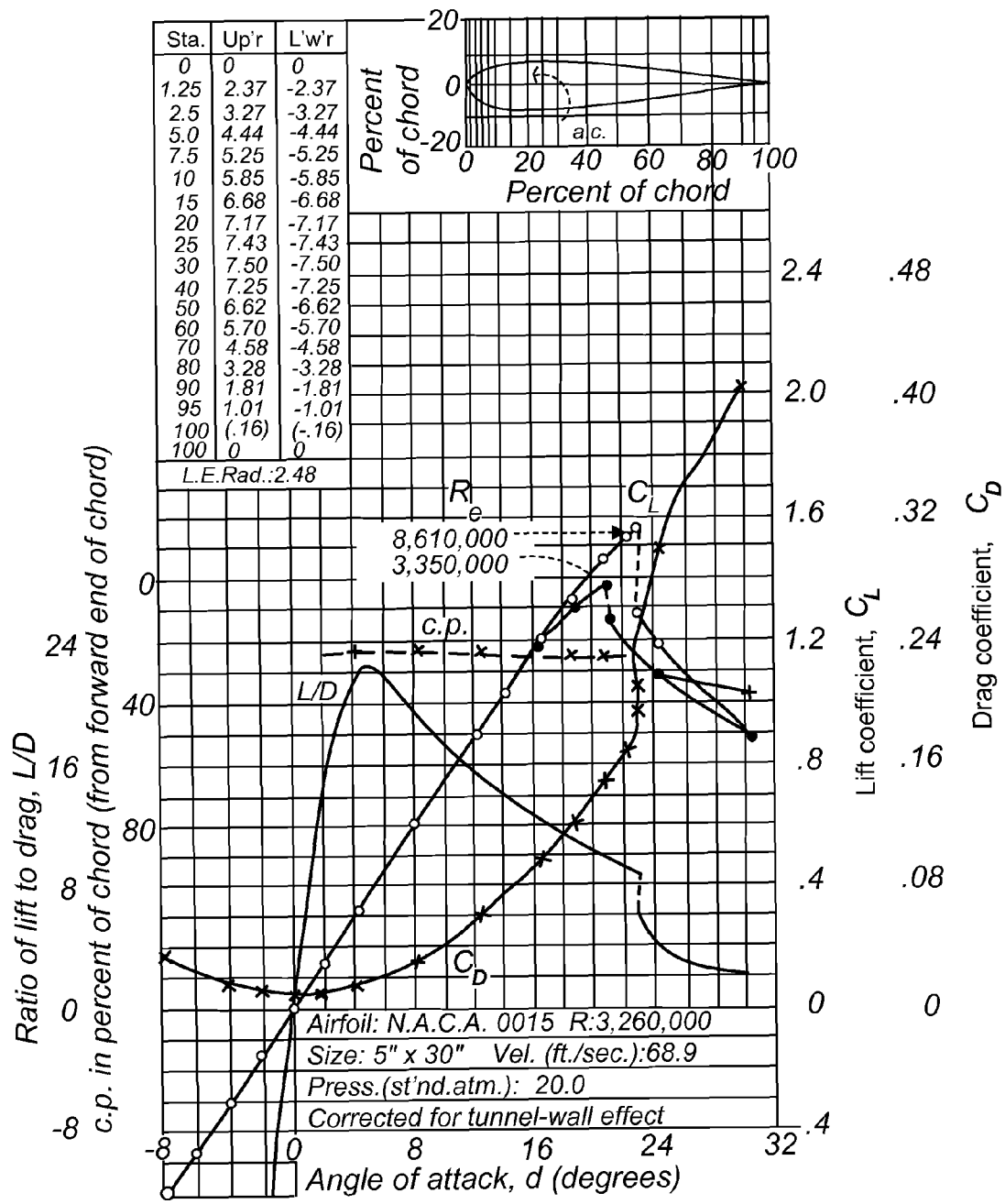
FIG. 3 shows the lift, drag, and center of pressure as a function of attack angle for a particular representative airfoil NACA0015 in the form of graphical and tabular data.
Figure 4:
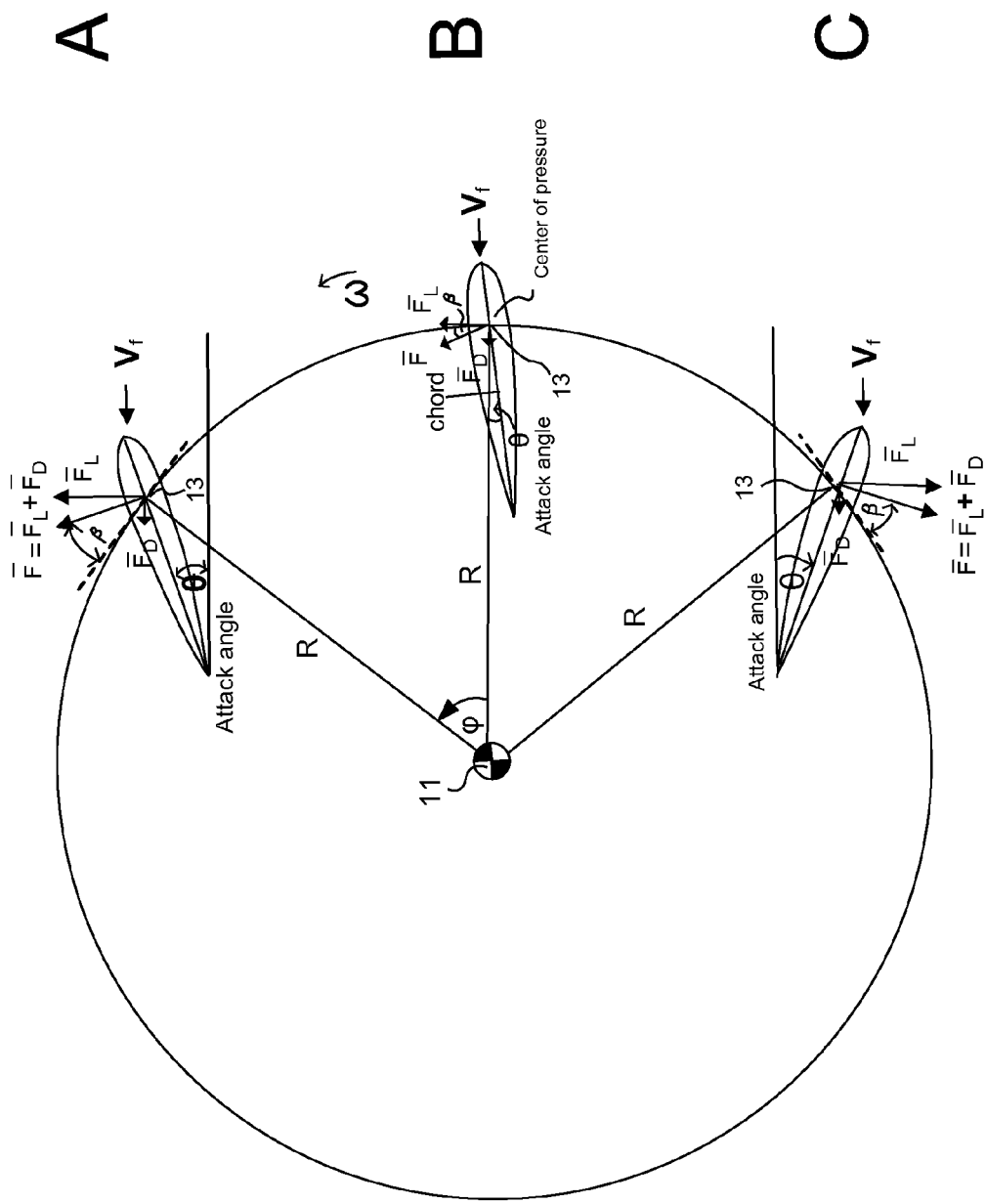
FIG. 4 shows three foils with different angles of attack to illustrate how the lift and drag vectors vary with positive and negative attack angles.

FIG. 3 shows the lift drag center of pressure as a function of attack angle for a particular symmetric airfoil, NACA0015, from one of the references above. The attack angle is the angle formed by the leading edge of the foil with respect to the fluid flow velocity. As can be seen in FIG. 3, the lift and drag coefficients $K_L$, $K_D$ are almost linearly proportional to the attack angle up to the stall angle. The center of pressure also varies with the attack angle, but much less than the lift and drag coefficients. Needless to say, every different airfoil has a different characteristic as shown in FIG. 3 and a designer selects one which is most suitable for his or her design. FIG. 4 shows three airfoils at rotational locations A, B and C given by the radial vector R with rotational angle φ with +19, +7, and −19 degrees of θ attack angles respectively to show how the lift and drag vectors vary with positive and negative attack angles θ in the operation of the FIG. 1 turbine as explained herein. The vector $V_f$ represents the direction and velocity of the fluid flow. Positive is assumed to be in a counterclockwise direction with respect to the central axis 11 and likewise with respect to foil axes 13.

From the equations (1) and (2) above, the lift and drag forces can be seen to be linearly proportional to the airfoil area S, lift $K_L$ and drag $K_D$ coefficients, and quadratically proportional to the fluid flow velocity v. For a given fluid flow velocity, which is assumed to be relatively slow, the only way to increase the forces in eqns. (1) and (2) is to change the attack angle θ or increase the airfoil area S, or both. Hence to generate a desired power from a slow fluid flow, a power generating system must have a much larger area than that of an equivalent power generating system designed for a faster flow fluid system.

Slow fluid flows are of interest because in nature these types of flows are very common, such as winds and ocean currents. But while the total energy in these flows is large, the "energy density" of a slow flow is small. As a result, a mechanical system must be large to effectively generate large amounts power from these fluid flows. However, as mentioned earlier, wind and ocean currents can change directions relatively quickly and an energy generation system should be able to respond to these changes rapidly and efficiently. This leads to a system with contradictory requirements, a large structure which is required to turn or move quickly. For example, the axis of blade rotation in most of the wind farm turbines today is either fixed or moves slowly.

The paddlewheel structure shown in FIG. 1 resolves these seemingly incompatible requirements. The structure is symmetric about its central rotational axis 11 which may be vertical or horizontal. Typically winds and currents move horizontally parallel to the ground and water surface which form boundaries for their respective fluids. If the central axis 11 is vertical, or perpendicular to a boundary of the fluid, the structure is essentially omnidirectional with respect to fluid flow directions. This obviously is a very important advantage in field applications where the fluid flow direction may change often. A power generation turbine with a vertical central rotational axis structure in accordance with the present invention can adapt to fluid flow changes rapidly and efficiently for maximum power generation.

Description of the Turbine

Figure 5:
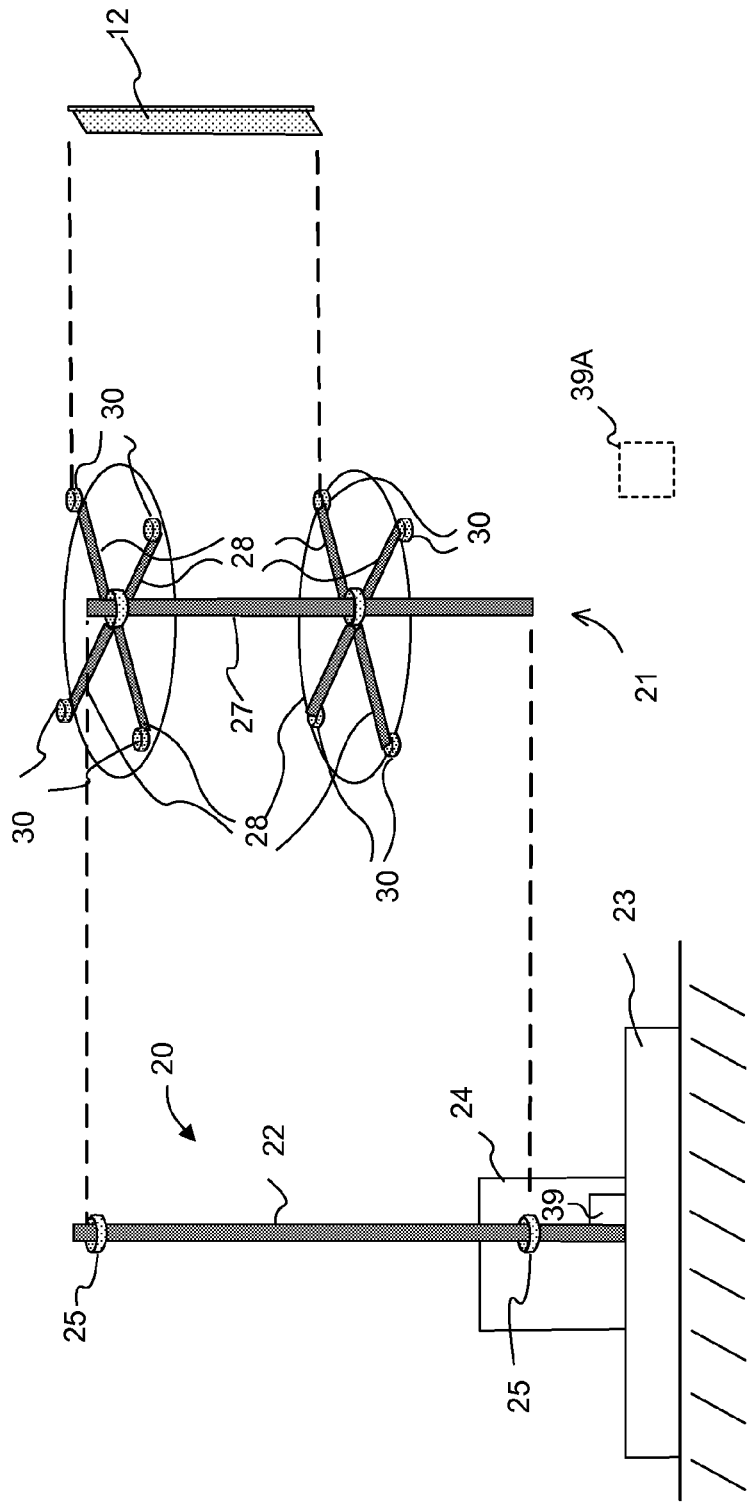
FIG. 5 shows the basic three parts of the FIG. 1 turbine.

The details of a power generating turbine according to one embodiment of the present invention are illustrated in FIG. 5. The turbine has three basic parts, a central axis assembly 20, a foil cage assembly 21 and the foils 12 themselves. The central axis assembly 20 is formed by a stationary rod 22 which is mounted to the ground or ocean floor by a foundation 23 for wind and water turbine applications respectively. The stationary rod 22 defines the central axis 11. The foundation 23 also holds the gear, belt, or chain-driven electric generator in a service and generator platform 24. The stationary rod 22 has bearing and mounting points 25 to allow a hollow central shaft 27 of the airfoil cage assembly 21 to rotate around the rod 22.

The foil cage assembly 21 includes the central shaft 27, which rotates easily about the stationary rod 22, and pairs of foil support rods 28 which are fixed to the shaft 27. The foil support rods 28 are perpendicular to the central shaft 27 and parallel to the ground in FIG. 5. Each foil support rod 28 of a pair, top and bottom, is also parallel to the other and the number of pairs of foil support rods 28 is equal to the number of foils 12 in the particular turbine design. At the end of each of the foil support rods 28 is a foil housing 30 which holds attack angle control mechanisms. The mechanisms include one or more stepper motors, servo motors, hydraulic or pneumatic driver systems, which rotate each foil 12 about its foil axis 13 which is parallel to the length of the foil 12 for the proper foil attack angle as described above.

A shaft encoder is mounted to the central shaft 27, part of the central axis 11 of the turbine. Either absolute or relative shaft encoders may be used, but an absolute shaft encoder simplifies the turbine design. The output of an absolute shaft encoder yields the rotational shaft angle from a selected static reference point. Since the foils 12 are placed at fixed locations on the foil cage assembly 21, the angular or rotational location, i.e., angle $\phi$, of each foil 12 with respect to the reference point can easily be determined from the shaft encoder.

The foils 12, which have a constant foil section along their lengths, are each mounted between their corresponding foil support rods 28 in the airfoil cage assembly 21. The foils 12 are placed in their housings 30, which contain all the bearings and the foil attack angle control mechanisms. To allow each airfoil 12 to rotate about its foil axis 13 with minimal energy, the foil rotational axis 13 is aligned with the center of pressure and center of gravity of the foil 12, themselves designed to coincide. In general, the center of pressure of a foil for any attack angle does not necessarily coincide with its center of gravity. At high rotational speeds, the centrifugal force acting upon the center of gravity of the foils can generate a large turning moment which must be overcome by the servo or stepper motors which control the attack angle.

Figure 6:
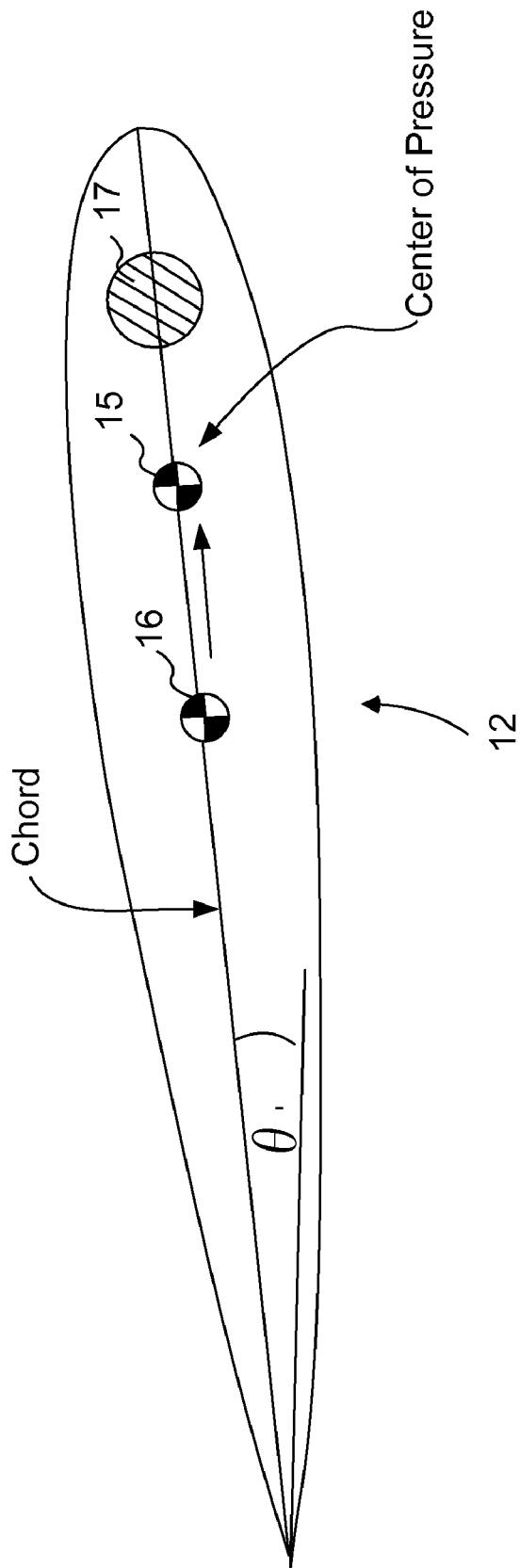
FIG. 6 is a chord cross-section of a foil to illustrate how the center of gravity of the foil is moved to coincide with the center of pressure in accordance with an embodiment of the present invention.

An example foil 12 whose foil section is illustrated in FIG. 6 shows how the center of gravity of the foil 12 is moved to coincide with its center of pressure in accordance with one embodiment of the present invention. As might be surmised by the foil section in FIG. 6, the center of gravity 16 is located near the center of the foil behind, i.e., toward the trailing edge, the center of pressure 15. To move the center of gravity 16, a rod 17 of dense material, such as metal, powdered metal, metal pellets and even sand bonded into a solid, is inserted into the foil near its leading edge. The material is selected for the turbine's particular application. The rod 17 effectively moves the center of gravity 16 forward toward the center of pressure 15. By adjusting the location of the rod 17 and its mass, the center of gravity can be moved to substantially coincide with the foil's center of pressure. As described earlier with respect to FIG. 3, a foil's center of pressure moves slightly with changes in the attack angle $\theta$. For water turbines, the rod 17 can be used to create foils of neutral buoyancy in water to eliminate that possible source of force on the foils.

Returning to the control of each foil 12, the angular position of the foil 12 is effected by one or more servo or stepper motors, part of the foil's attack angle control mechanism in foil housings 30 at the end of the foil support rods 28. There are also shaft encoders for each foil 12 to give the foil's angular position about the foil's rotation axis 13 relative to a local reference. With all foil angles referenced to their foil support rods 28 and to the main central rotational shaft 27, the optimal attack angle calculated by computer for each foil 12 is referenced to the rotational position of the main shaft 27.

A computer preferably in the form of one or more microcontrollers is preferred to operate the turbine in real time. The computer is preferably located in the service and generator platform 24 represented by the box 39 in FIG. 5 and communicates over control lines parallel to the power lines. Alternatively, the computer might be located separately from the service and generator platform 24 and displaced from the central axis 11 and foils 12, such as indicated by the displaced dotted line box 39A. In this embodiment the computer sends output control signals and receives input control signals, e.g., encoder signals, wirelessly. Of course, in this case the encoders for central axis 11 and foil axes 13 have transmitters, and the foil servo or stepper motors have receivers for wireless communication with the computer 39A which has both a transceiver and receiver.

Figure 7:
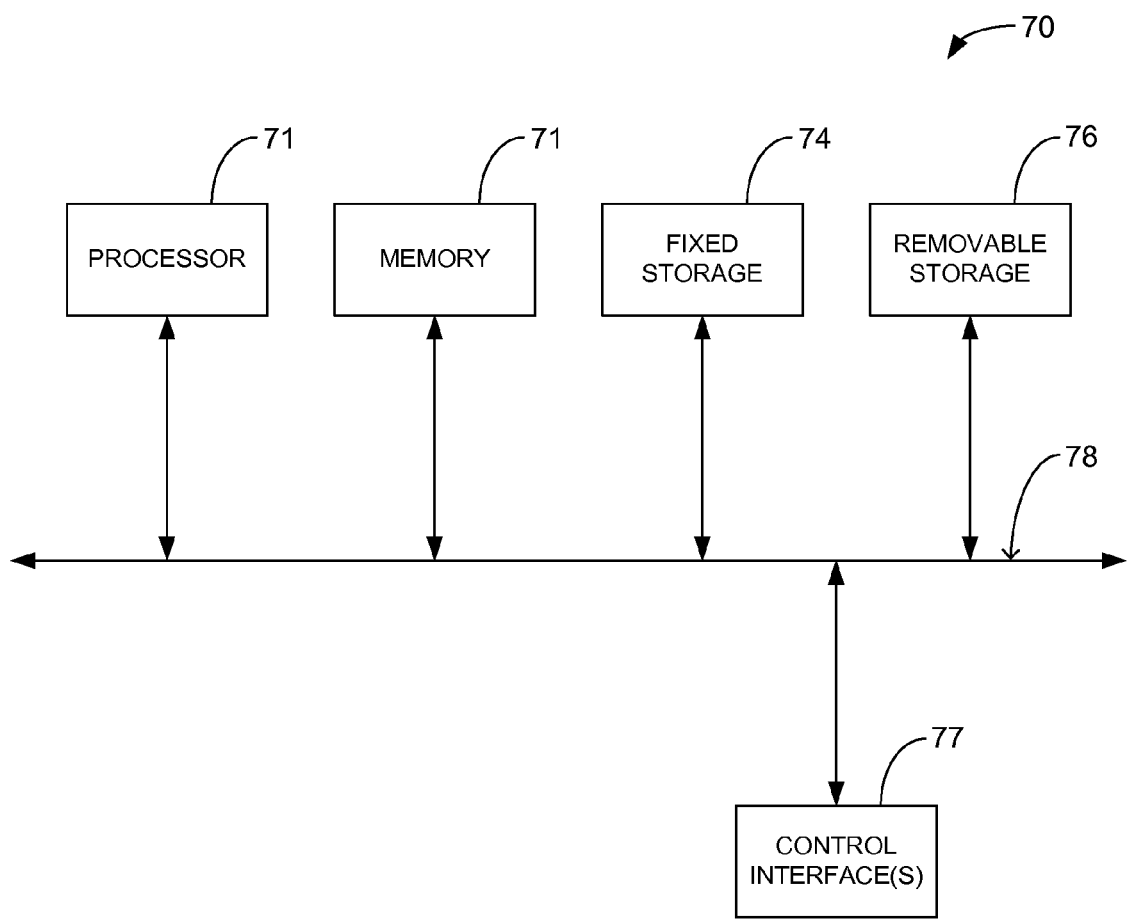
FIG. 7 is a block diagram representation of a computer controlling the operation of the turbine of FIGS. 1 and 5.

The computer represented by the boxy 39 or 39A is shown in FIG. 7 and includes a memory subsystem 72 which can store and retrieve software incorporating computer code that implements aspects of the invention, data for use with the invention, and the like, described in further detail below, and a one or more processors 71 which, among other functions, processes the instructions and data of the computer code. The computer further includes subsystems, such as fixed storage 74 (e.g., hard drive), and removable storage 76 (e.g., portable Flash units, CD-ROM drive, etc.), and one or more control interfaces 77, all connected by a system bus 78. The control interface(s) 77 provides pathways for the computer to communicate with the rest of the turbine, i.e., to send output control signals and to receive input control signals, to communicate with the outside world. Additional or fewer subsystems in the control block may be used.

Figure 8:
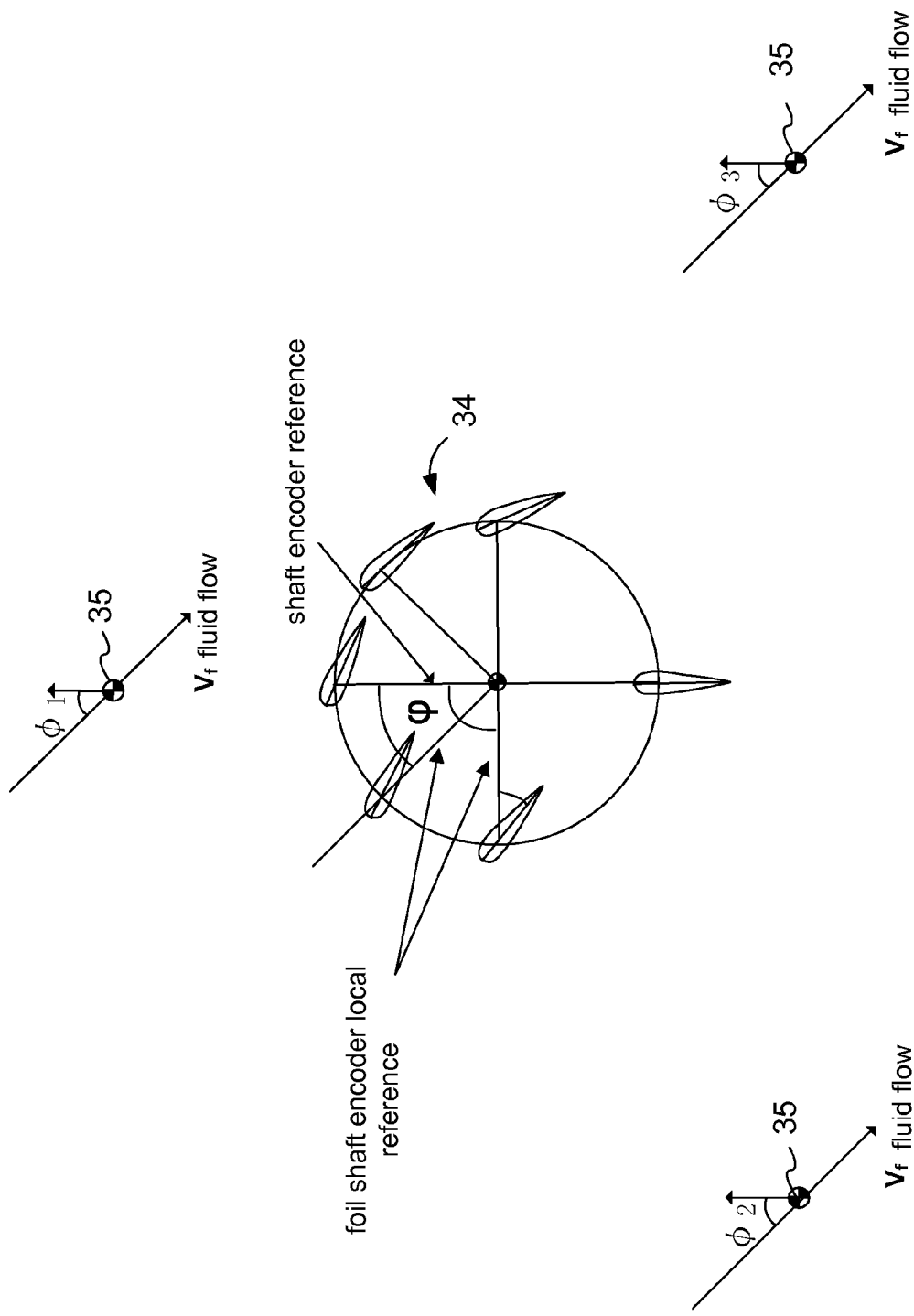
FIG. 8 shows fluid flow direction and speed sensors for a turbine according to an embodiment of the present invention.

To determine the speed and direction of the fluid flow $V_f$ with respect to the turbine of the present invention, several fluid flow speed and direction sensors are placed in proximity of the turbine proper 34 as shown in FIG. 8. Even though one sensor placed on the top of the turbine might be sufficient, it is preferable to have more accurate information on this data which changes with time. As shown in FIG. 8, at least three sensors 35 located in the peripheral proximity of the turbine proper 34. To determine the speed and direction of the fluid flow at the turbine from the plurality of sensors, the sensor data is averaged. Of course, the flow sensors should be placed as close to the turbine as possible but not so close that the fluid flow $V_f$ is disturbed by the turbine itself. As a result, the fluid flow direction is accurately referenced with respect to the shaft encoder reference point.

Operation of the Turbine

Figure 9:
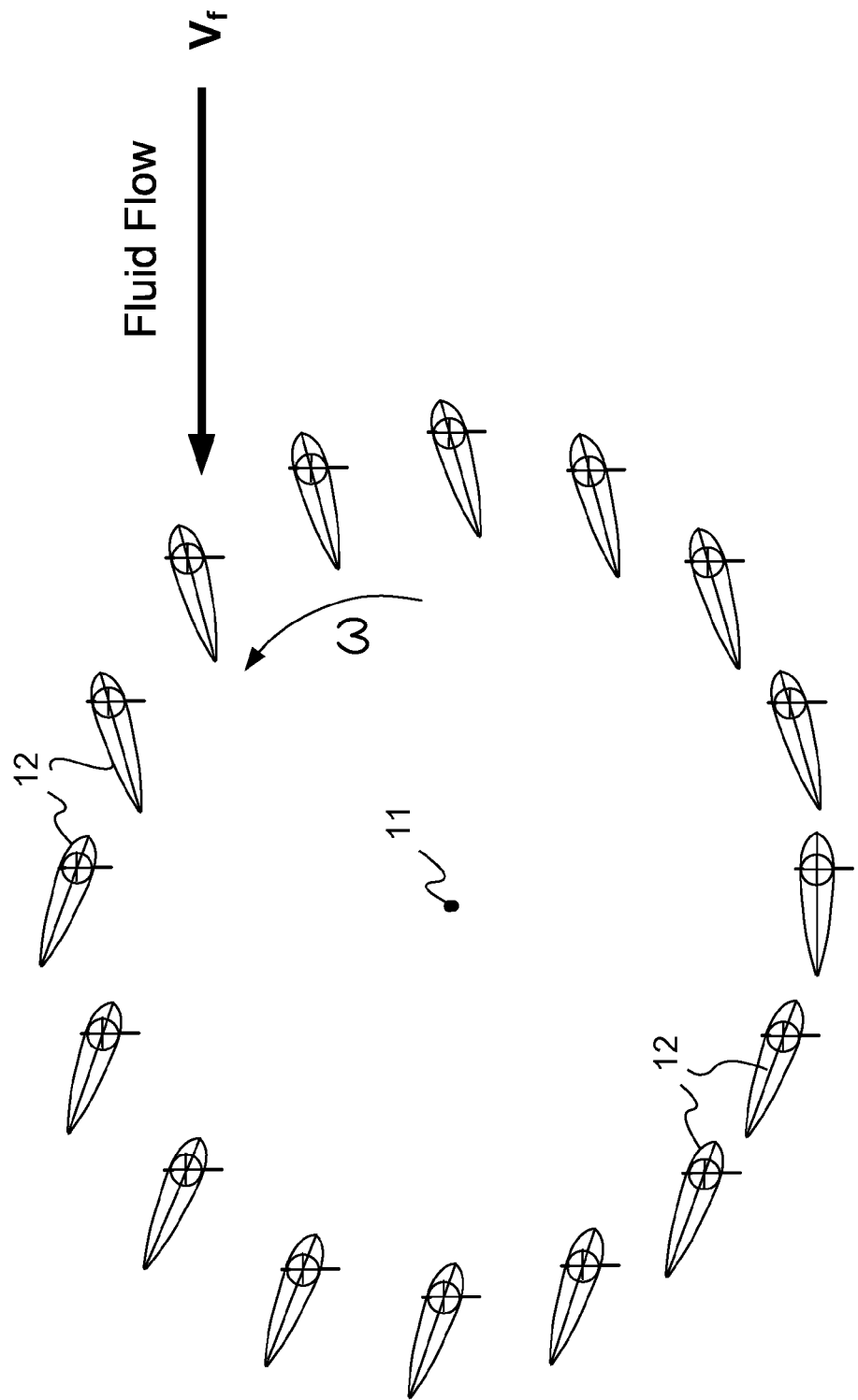
FIG. 9 shows a foil at sixteen rotational locations with optimal attack angles for a turbine according to an embodiment of the present invention.

As shown in FIG. 1, the plurality of foils 12 are mounted in a circle around the central axis 11 around which the foils 12 rotate. The foils 12, having a constant cross-section, can also rotate about their individual foil axes 13. The attack angle of each foil 12, the angle of the foil 12 with respect to the direction of fluid flow, is controlled by computer as a function of the fluid flow velocity and direction, the angular location and velocity of the foil 12 as it rotates about the central axis 11, such as illustrated in FIG. 9. Program codes are stored in the memory of the computer 39 (see FIG. 5), or 39A, and include the number, type and the location of the foils 12, the foil data for the lift/drag/center of pressure as a function of attack angle θ as a table function, and the radius R of the turbine. Input control signals include the dynamic angular position φ of each foil 12, the rotational speed ω of the turbine, the direction and the speed of the fluid flow against the turbine, the vector $V_f$. The output control signals from the computer 39 include signals to the servo or stepper motors for each of the foils 12 to assume its optimal attack angle for the foil 12 to maximize its torque with respect to the central rotational axis 11. The attack angle θ of a foil 12 is a function of its angular location φ, turbine rotational speed ω, and the resulting velocity and direction of the fluid medium, V, with respect to the foil 12.

Figure 10:
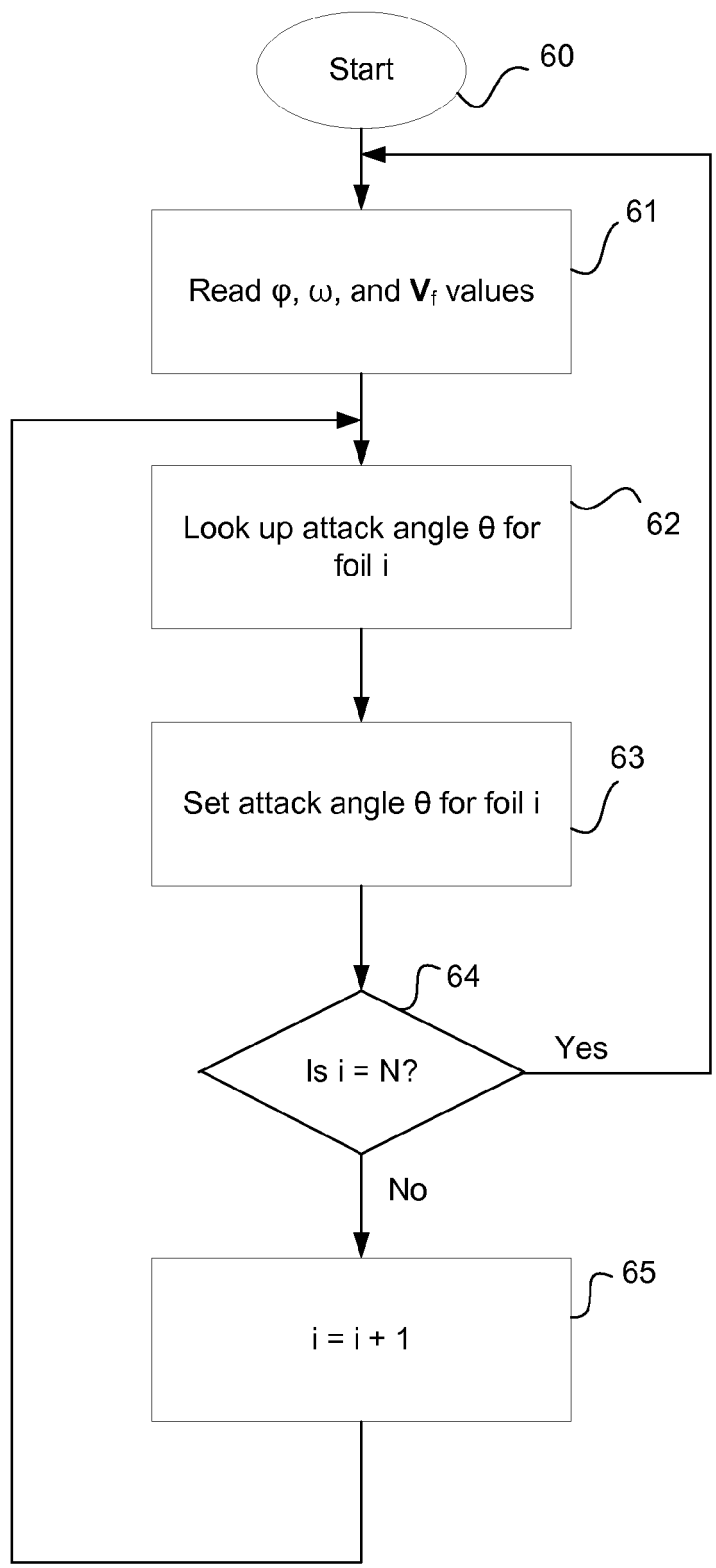
FIG. 10 is a flow chart of general operations in setting the attack angles of the foils of the turbine.

The general operation of the computer to set the attack angles θ of the foils 12 is illustrated by FIG. 10. After the computer operation is started, including initialization operations represented by step 60, the angular position φ of an initial foil 12, foil i=1, the rotational speed ω of the turbine, and the fluid flow vector $V_f$, are read in step 61. That is, the shaft encoder for the central shaft 27 is read to determine the angular position φ and the rotational speed ω calculated from the rotation speed of the shaft encoder, while the fluid flow speed and direction sensors are read for the fluid flow vector $V_f$. The digital outputs of the shaft encoder and sensors are used as input to a look-up table to find the attack angle θ of a foil 12 in step 62 and the foil is set accordingly by step 63. The attack angle θ is set for maximum torque about the central axis 11. Decision step 64 tests whether the index i is equal to the N, the total number of foils 12 in the turbine. If not, the index is incremented and the attack angle for the next foil is looked up. If yes, the shaft encoder and the fluid flow speed and direction sensors are read to get the values for φ, ω and $V_f$, and the process of finding the attack angles θ for all the foils 12 is started over again. For one set of φ, ω and $V_f$ readings, the computer 39 sets the attack angles for all N foils and for the next set of readings, the computer resets the attack angles, and so forth. This is possible given the relatively slow speed of the fluid flow and low rotation speed of the turbine with respect to high speed electronic circuits. Furthermore, the use of a look-up table for the attack angle further speeds the electronic operations.

The attack angles θ in the look-up table are selected to maximize the torque on the foil 12 at any given angular position φ with the turbine rotating at ω. By using the opposite attack angles –θ, a negative moment with an identical value can be generated for the same fluid flow. Any direction of torque and rotation can be generated by any fluid flow direction by controlling attack angles.

Calculation of the Attack Angles

Figure 11:
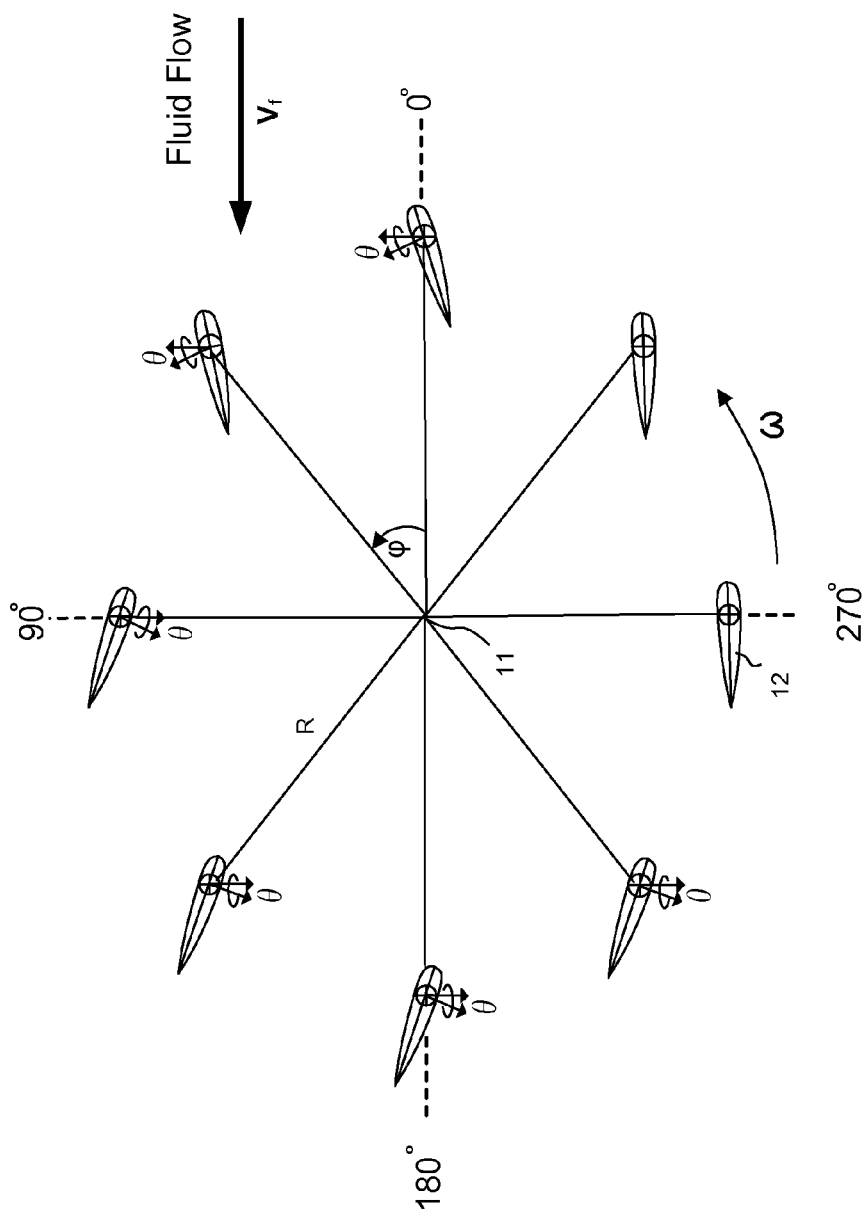
FIG. 11 shows the attack angle of a turbine foil in eight rotational locations controlled as a function of the foil's location, the fluid flow direction and speed, and rotational speed of the foil in accordance with one embodiment of the present invention.

FIG. 11 illustrates a visual representation of the operation of the turbine and the movement of its foils according to the present invention. The lift, drag, and total vectors at eight different angular locations are shown in FIG. 11. In this illustration, the foil 12 has a symmetric cross-section, specifically NACA0015. The basic equations of rotational motion are:

$$\tau = I\frac{d^2\varphi}{dt^2} + k_r\frac{d\varphi}{dt} \text{ and} \tag{3}$$

$$\omega = \frac{d\varphi}{dt} \tag{4}$$

where φ, τ, I, $k_r$ and ω are respectively the rotational angle about the center axis 11 in radians, the torque, the moment of inertial, the rotational friction coefficient and the rotational speed in radian/sec. Eqn. (3) is the differential equation for torque τ and eqn. (4) is the equation for angular velocity ω. Positive torque is described as an anti-clockwise rotation about the central axis 11 is generated with these computer-optimized attack angles.

Torque τ in the paddle wheel turbine is the result of the force vector F generated by the vector sum of orthogonal lift $F_L$ and drag $F_D$ forces due to the fluid flow acting upon the foils 12 placed in a circle with a radius of R as shown in FIG. 11. The generated torque of a foil 12 at the angular location φ, in its most general form can be represented as the vector product between the radius vector r and the force vector F as, $$\tau = R \times F \tag{5}$$

where $$R = R[\cos(\varphi)]i + \sin(\varphi)j] \tag{6}$$

and i and j are the unit vectors in the X and Y directions respectively.

The direction of the torque τ is conveniently embedded in the vector product shown in eqn. (5). Positive direction is the counter clockwise and negative is clockwise direction, as stated earlier. With k the unit vector along the Z direction and R and F are in the X-Y plane, as shown in FIG. 10, τ has only a Z direction vector component. If τ in eqn. (5) results in a +k unit vector direction, an anti clock-wise rotational torque direction is represented. If a –k unit vector direction results, it represents a clock-wise rotational torque direction.

The turbine has N equally spaced foils 12 connected to the central shaft 27 at the rotational axis 11. Foil support rods 28 defining a radius of R about the rotational axis 11. See FIG. 5. By arbitrarily selecting a reference foil and numbering it as 1 and monitoring only its reference rotation angle φ with the cage shaft encoder attached to the stationary reference is enough to determine all of the other airfoil rotation angles $\varphi_n$'s by the simple relation, $$\varphi_i = \varphi + (i-1)\Delta\varphi, \text{ where } \Delta\varphi = 2\pi/N. \tag{7}$$

The torque generated by the nth airfoil can be given as, $$\tau_n = R_n \times F_n \text{ where } R_n = R[\cos(\phi_n)]i + \sin(\phi_n)j \quad (8)$$

The total torque of the system then simply becomes the sum of all torques generated, $$\tau_{total} = \sum_{i=1}^{N} \tau_i \quad (10) \quad (9)$$

To calculate the torque in eqn. (5) for a foil 12 requires the calculation of the total force vector F which has orthogonal $F_L$ lift and $F_D$ drag components, which are given by eqns. (1) and (2). Arguments of the lift and drag forces, which are the orthogonal components of the force vector F in eqn. (5) are the magnitude of the relative fluid velocity v with respect to the foil, the attack angle θ, and the surface area S, which is the chord length multiplied by the length of the foil 12.

The foils 12 rotate with rotational speed ω at radius R about the axis 11 so that each foil 12 has a tangential velocity $V_t$. But the fluid is flowing past the turbine, defined by the axis 11, with a fluid flow velocity $V_f$. The v in the lift and drag equations (1) and (2) is the magnitude of the relative fluid flow velocity with respect to the rotating foil 12 in m/sec. The relative fluid velocity can be expressed as:

$$V = V_f - V_t \quad (10)$$

where the fluid velocity in Cartesian coordinates can be written as:

$$V_f = V_{xf}*i + V_{yf}*j, \text{ where } |V_f|^2 = \sqrt{V_{xf}^2 + V_{yf}^2}. \quad (11)$$

$V_{xf}$ and $V_{yf}$ are the fluid flow components along the X and Y axes respectively. An X-Y representation of a point on the circle of the foils 12 rotating about the origin, with the radius R and rotation velocity ω, can be written as:

$$x(t) = R*\cos(\phi) = R*\cos(\omega t); \text{ and} \quad (12)$$

$$y(t) = R*\sin(\phi) = R*\sin(\omega t). \quad (13)$$

Differentiating the equations immediately above with respect to time t yields the tangential velocity in vector form:

$$V_t = R*\omega*[-\sin(\omega t)*i + \cos(\omega t)*j]; \quad (14)$$

And by substituting eqn. (14) into eqn. (10), the relative fluid flow velocity is obtained. In vector form:

$$V = [V_x + R*\omega*\sin(\phi)]*i + [V_y - R*\omega*\cos(\phi)]*j. \quad (15)$$

where the X and Y components for V are:

$$V_x = [V_{xf} + R\omega \sin(\phi)] \quad (16)$$

$$V_y = [V_{yf} - R\omega \cos(\phi)] \quad (17)$$

The magnitude of V, i.e., $$v = |V| = \sqrt{V_x^2 + V_y^2}, \quad (18)$$

is used for the calculation of the magnitude of the lift $F_L$ and drag $F_D$ forces of eqns. (1) and (2).

Figure 12:
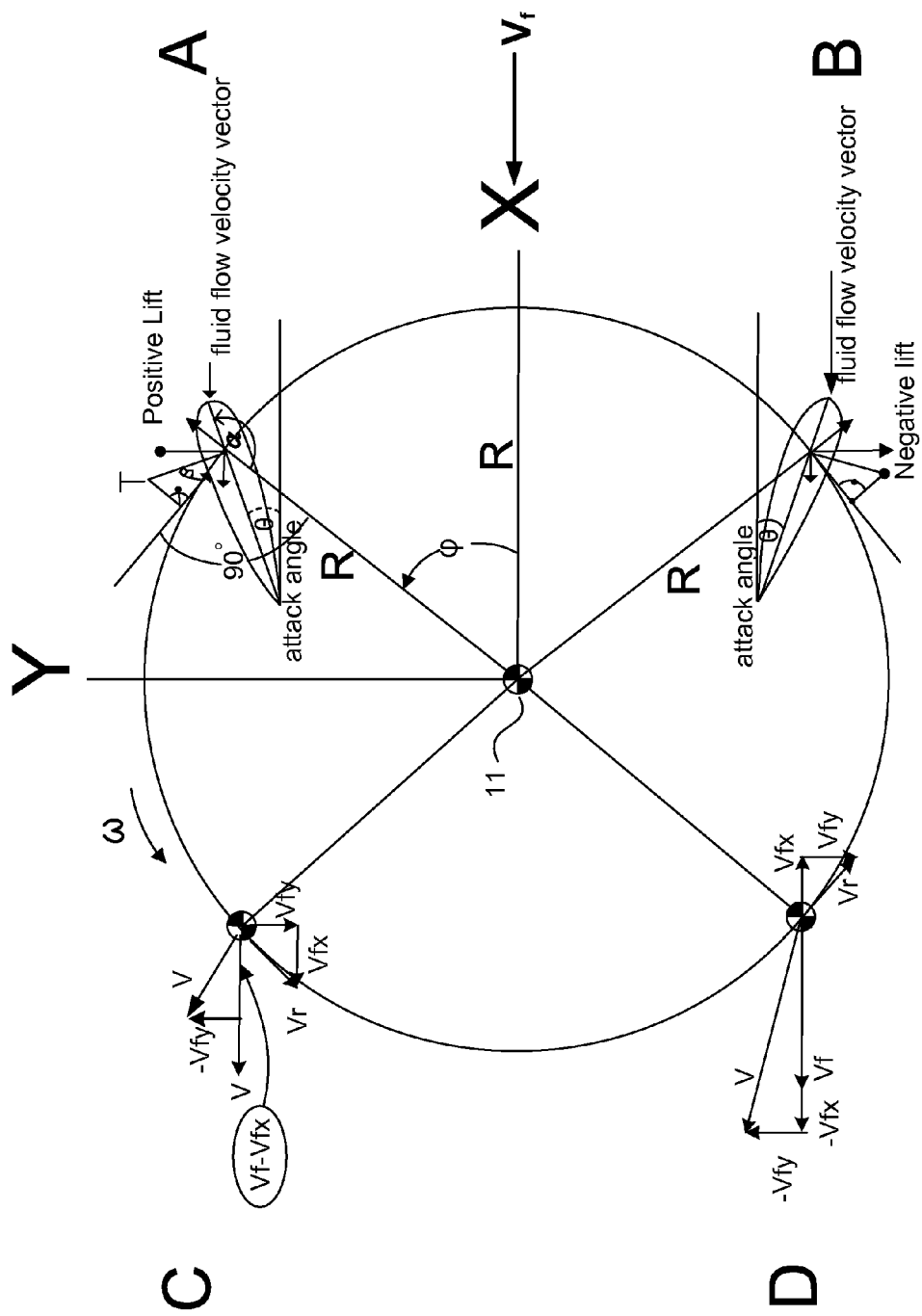
FIG. 12 shows the relation between the forces generated, the moment, and attack angle on a foil at two arbitrary locations on a turbine according to the present invention.

This graphically illustrated at foil positions C and D in FIG. 12. The relative fluid velocity vector V which creates the lift and drag forces on the foils 12 and the torque for the rotation of turbine as given by eqn. (5), is related not only to the fluid flow velocity $V_f$ but also to R, ω and φ. See eqn. (15).

To calculate the lift and drag coefficients in eqns. (1) and (2), θ the angle of attack of each foil relative to the fluid flow is needed. Using the analytically derived relative fluid velocity vector V as given in eqns. (15) itself as the angle reference is very convenient. It should be noted that as shown in eqns. (15)-(18), both the direction and the magnitude of the relative fluid flow vector is a function of $V_{xf}$, $V_{yf}$, ω, R and φ.

A local coordinate system, x', y', which has its origin located at the center of the point where the lift and drag forces are generated is introduced. This point corresponds to the R in the main X, Y coordinate system as given by eqn. (6). As explained earlier, the axis of rotation of the foil 12 and its center of mass are also designed to be at that point. The x' axes of this local coordinate system is set to be in the opposite direction of the relative fluid velocity vector V. A unit vector $l_{e(0)}$ represents the unit vector along the x' axes. $l_{e(0)}$ stands for leading edge unit vector with zero degree attack angle and can be written as:

$$l_{e(0)} = -V/|V| \quad (19)$$

$$l_{e(0)} = -i[V_{xf} + R\omega \sin(\phi)] - j[V_{yf} - R\omega \cos(\phi)]/|V| \quad (20)$$

If the leading edge of the foil 12 at any given $V_{xf}$, $V_{yf}$, ω, r and φ is in the direction of $l_{e(0)}$ as given in eqn. (19), and in expanded form in eqn. (20), its attack angle θ is zero. $l_{e(+0)}$ represents the unit vector with positive attack angle θ with counterclockwise direction with respect to $l_{e(0)}$. Similarly, $l_{e(-0)}$ defines a negative attack angle −θ which obtained by rotating $l_{e(0)}$ by θ in the clockwise direction.

A unit vector along the y' direction completes the local coordinate system, x', y'. The unit vector is represented by $u_l$ and is generated by rotating the unit vector $l_{e(0)}$ by 90° counter clockwise. The "$u_l$" stands for unit lift vector. This selection of $l_{e(0)}$ and $u_l$ yields consistent lift and drag directions in all quadrants for any attack angle. Drag direction is easy to determine since it is always in the direction of the relative fluid vector direction V or opposite to $l_{e(0)}$ as, $$u_d = -l_{e(0)} \quad (21)$$

For positive attack angles, the lift direction is always along $u_l$ and for negative attack angles, it is always in the $-u_l$ direction.

As an aside, defining $l_{e(0)}$ as in eqn. (20) is another convenience in defining the foil leading edge angle with respect to R, which is the reference for the foil attack angle controls. Needless to say, the angle φ of a foil is equal to the angle of the foil's support rod 28. The $n^{th}$ connecting rod unit vector $u_{rn}$ is defined as a unit vector along the opposite direction of $R_n$. In other words it is the unit vector always pointing to the stationary rod:

$$u_{rn} = -R_n = -[i \cos(\phi_n) + j \sin(\phi_n)] \quad (22)$$

The control angle α is defined as the angle between the connecting rod unit vector $u_{rn}$ and the leading edge vector $l_e(\theta)$. Geometrically the α control angle can be constructed by rotating $u_{rn}$ in the counter clockwise direction until it aligns with airfoil leading edge vector $l_e(\theta)$. In other words, the control angle α is zero when the leading edge of the airfoil is pointing to the rotational axes of the turbine. This α control angle can measured directly by the airfoil shaft encoder by placing the stationary reference on the connecting rod and can be calculated as a function of φ and θ.

Returning to the calculation of torque on a foil, the foil lift and drag coefficients, $K_L$ and $K_D$ of eqns. (1) and (2), and the center of lift as functions of the attack angle θ must be known to calculate of the total force F on a foil 12. Foils have been extensively studied as described earlier and this information can be provided in computational tables. For the described embodiment of the present invention, the foil 12 is NACA0015 which is well-known. For values not in tabular form, linear interpolation, cubic spline fit or other techniques assure accurate values for $K_L$, $K_D$ and the center of lift for any attack angle θ for the foil at any angular location φ. These interpolation techniques operate effectively even for attack angles θ larger than the stall angle of the foils.

With eqn. (18) defining the magnitude of the relative fluid vector V, eqns. (1) and (2) are converted into vector form by employing $u_d$ and $u_l$, and the lift $F_L$ and draft $F_D$ vectors are calculated. Taking the vector sum of $F_L$ and $F_D$ vectors as:

$$F = F_L + F_D \qquad (23)$$

This gives the force F for the calculation of the torque generated by the foil 12 given at eqn. (5).

For any given attack angle θ, angular location φ, rotational speed ω, turbine radius R, fluid flow velocity $V_f$, the directional information of the orthogonal lift $F_L$ and drag $F_D$ vectors is also known with the introduction of $u_d$ and $u_l$ unit vectors, as explained earlier. Therefore the formulation of F from its orthogonal components in eqn. (5) is complete for the torque calculation.

The relative fluid velocity V in eqn. (14) displays a nonlinear relationship to φ, ω, and R. Since the lift and drag forces as given in (1) and (2) are quadratically related to the magnitude of V, the resulting F in the torque eqn. (5) becomes even more non-linear with respect to φ, ω, and R. The torque relation of eqn. (5) adds even more non-linearity to the system.

As a result, the governing differential equation (3) for torque becomes a non-linear ordinary differential equation where an analytical solution does not exist generally. But for control purposes, eqn. (3) need not be solved at all. The control program first determines the foil attack angles θ which maximize the torque for all foils at any angular location φ for a given fluid velocity $V_f$ and rotation speed ω, and then operates the turbine with the determined attack angles stored in the look-up table. The control program should be simply fast enough to control the foil attack angles in real-time while the turbine is turning at its maximum designed rotational velocity. This is possible with the properly selected attack angles θ in the look-up table.

The look-up table is created by calculations which assume that the turbine is rotating with a constant rotational velocity ω for a given fluid velocity vector $V_f$. As explained above, for any given attack angle θ, rotational speed ω and rotational position φ, the torque can be calculated analytically, e.g., the description about eqn. (5). To find the attack angle θ which maximizes the torque at any given φ, a simple search is performed. For a given φ, first the V relative fluid velocity vector, as given in eqn. (16) and from that $l_{e(0)}$ shown at eqn. (21), are calculated. The attack angle θ is scanned in small increments of Δθ between $θ_{min}$ and $θ_{max}$. For each resulting θ, the torque τ is calculated as given in eqn. (5). The typical Δθ increment is set to less than half a degree and the default values of $θ_{min}$ and $θ_{max}$ are the negative and positive stall angles with a user-defined stall margin. After scanning θ between $θ_{min}$ and $θ_{max}$, the attack angle that gives the largest torque in the direction of rotation is taken as the optimal attack angle for that φ location.

If all of the calculated torques in a θ scan interval are in the opposite direction of rotation, which is possible for some angular locations φ's, the attack angle which gives minimum torque in the opposite direction of rotation is selected. Furthermore, for some angular locations φ's, identical torque values can be obtained for opposite attack angles due to the symmetry. This is an indication of two possible solutions and is perfectly acceptable. For these situations the θ is picked which results in minimum foil rotation from its previous angular location φ. This simple algorithm finds the optimal attack angle that maximizes the torque obtainable from the paddle wheel turbine for a given $V_f$ and φ rotating at a given constant ω for any chosen direction of rotation.

The angular position φ is scanned from 0 to 360 degrees with m increments and all the optimal attack angles θ are stored as a function of φ in a table form, i.e., the look-up table. Typically m is in the order of 128 or larger for a smooth discrete representation of the optimal attack angles θ versus angular location φ. Since all the foils remain in the interval of 0 to 360 degrees all the time, their optimized attack angles are simply calculated from the table generated as their $φ_n$'s are given by the φ reading from the cage shaft encoder as shown by simple relation as in eqn. (8).

The look-up table is expanded for other rotational velocities ω and different fluid velocity vectors $V_f$ to handle a wide range of conditions for the turbine. As stated earlier, the calculated attack angles θ are for maximum torque to maximize the energy generated by the turbine. The steps described are readily adaptable to any value between zero and its maximum value. Thus if speed control is desired to protect the turbine against high fluid flow velocities, such as high winds or currents, the attack angles can be determined and set for lower torque values.

Efficacy and Behavior of the Described Turbine

Despite the lack of a general analytical solution, the differential eqn. (3) can be solved numerically. In fact, with such solutions, the turbine can be understood and optimally designed. The result is that all the dynamics of the turbine paddle wheel structure, such as τ, φ, ω, etc., can be calculated as a function of time, radius, airfoil type, etc.

Solution of the differential eqn. (3) illustrates the efficacy of the turbine of the present invention. To solve for the moment of inertia I in eqn. (3), the following must be considered. Basically, the moment of inertia of a point object with a mass of m and rotating around rotational axes with a distance of r is given as, $$I = mr^2 \qquad (24)$$

For n point objects (24) becomes a simple summation as:

$$I = \sum_{i=1}^{n} m_i \cdot r_i^2 \quad I = \sum_{i=1}^{n} m_i \cdot r_i^2 \qquad (25)$$

It is clear that the summation given by eqn. (25) can be converted to an integral for real objects with any given mass distribution and having non zero volumes. As a useful application example of the integral definition, the moment of inertia related to this work can be in the moment of inertia calculation of the foil support rods 28. Assuming that a foil support rod has a uniform mass distribution density and a length of l, its moment of inertia can be given as:

$$I = \int_{r=0}^{l} \rho r^2 dr = \frac{1}{3}(\rho \cdot l) l^2 = \frac{1}{3} M l^2 \qquad (26)$$

If the mass distribution density along r is not uniform and is represented by a function of radius as ρ(r), the integral of eqn. (26) can be rewritten by substituting ρ with ρ(r). If the object has many parts, such foil support rods, foils, and elements as described above, the total moment of inertia is the sum of the moment of inertia each of the these parts as:

$$I_{total} = \sum_{i=1}^{n} I_i \quad I_{total} = \sum_{i=1}^{n} I_i \tag{27}$$

Since the geometry of the paddle wheel structure of the described turbine is fairly straightforward, eqn. (26) is used to calculate the moment of inertia of individual parts like foils 12 and foil support rods 28. By applying eqn. (27) the total moment of inertia of the entire system is obtained accurately.

Figure 13:
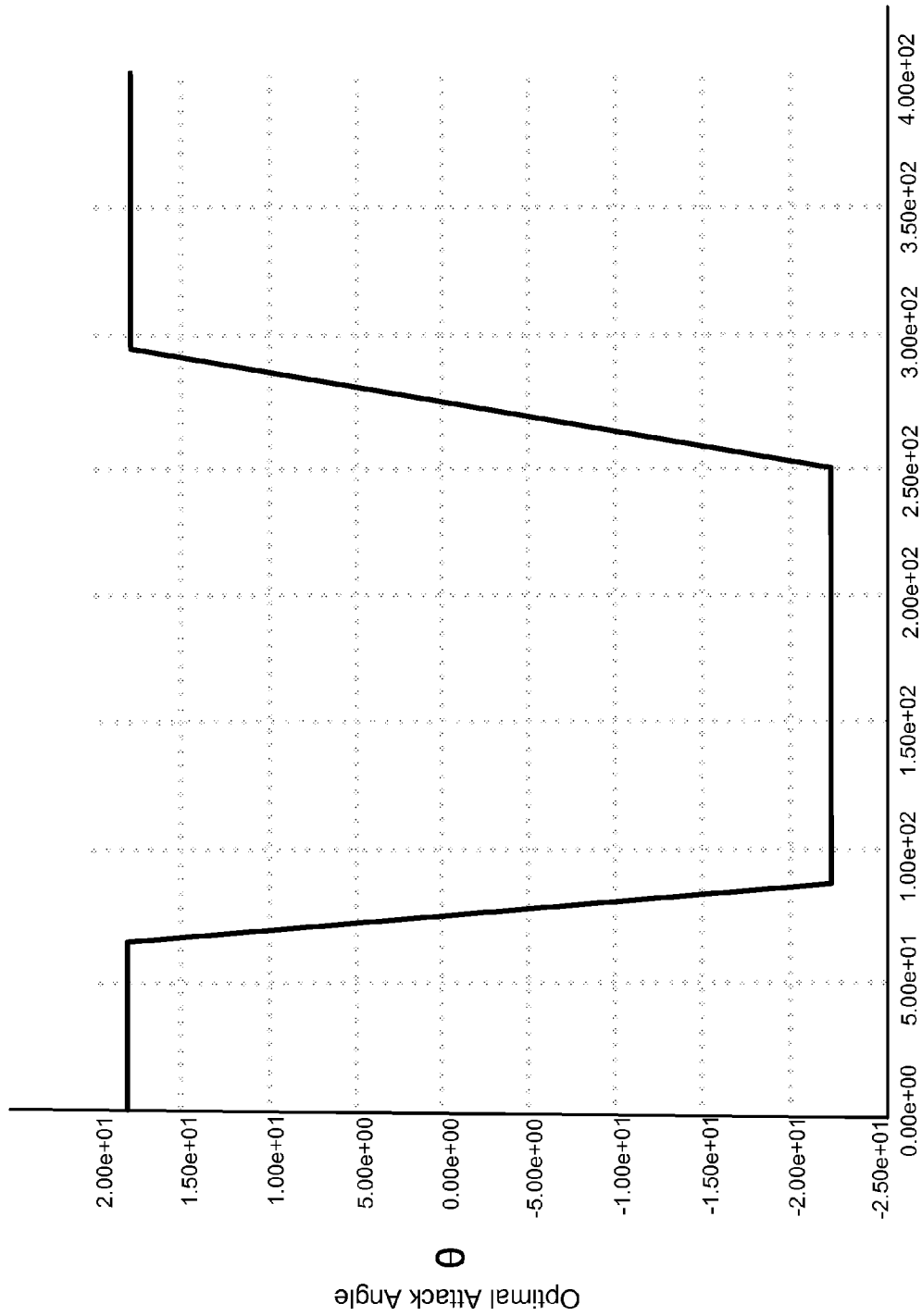
FIG. 13 is a plot of the optimal attack angle as a function of rotational location of the FIG. 10A foil.
Figure 14A:
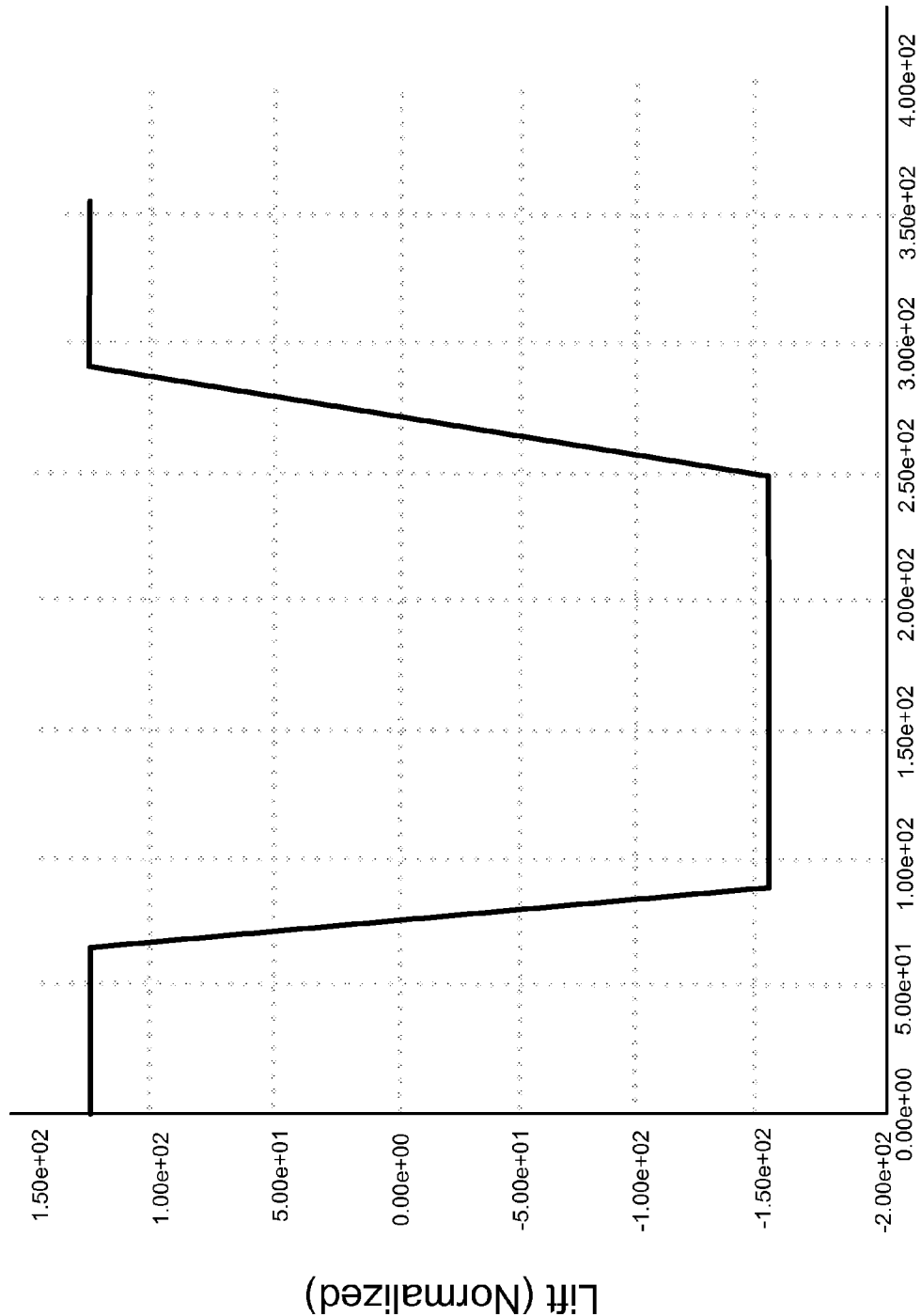
Figure 14B:
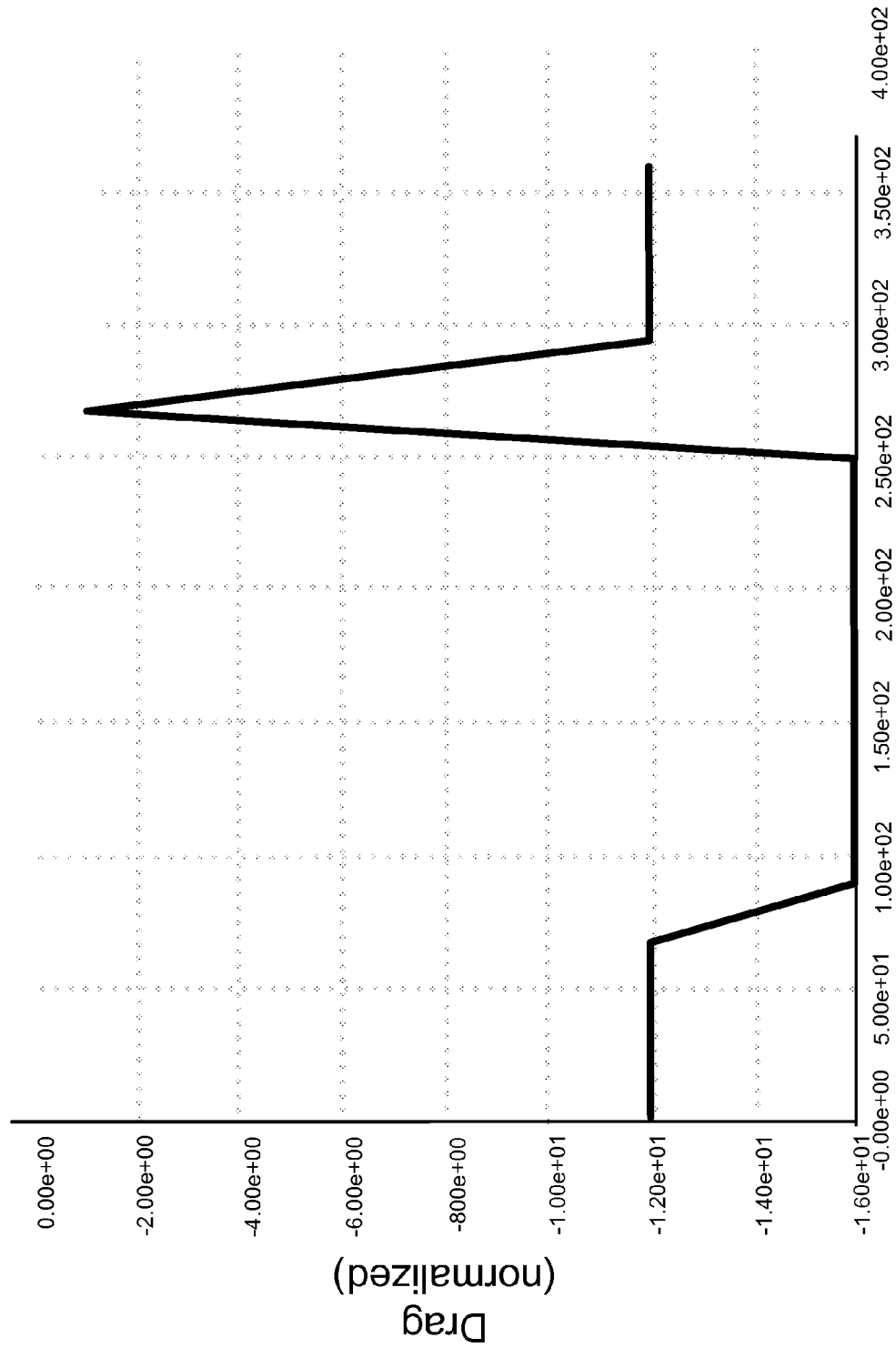

With the calculations, the differential eqn. (3) can be solved numerically. One result is shown in FIG. 9 which illustrates the optimal attack angles θ at 16 equally spaced angular locations for a particular foil 12 about a rotation of the central axis 11. FIG. 13 plots these optimal attack angles with respect to the foil's rotation. The foil in this example is airfoil NACA0015 and the medium is air. FIGS. 14A-14D respectively plots the normalized lift, drag, magnitude of the forces on the foil 12 and its moment as it rotates about the axis 11. It should be noted that the horizontal axes for these graphs are in terms of radians. As shown in FIGS. 14A and 14B, for clockwise rotation the optimal attack angles between angular locations φ=270° to 90° are positive and between 90° to 270° are negative. The attack angle θ is positive for half of the rotation and negative for the other half, which renders a symmetric foil section more efficient compared to a non-symmetric foil, though turbines of the present invention are operable with non-symmetric foils. For increased moments capable of being generated by non-symmetric foils, it is preferable to use high lift devices, such as described below with respect to FIGS. 15A and 15B.

Figure 14D:
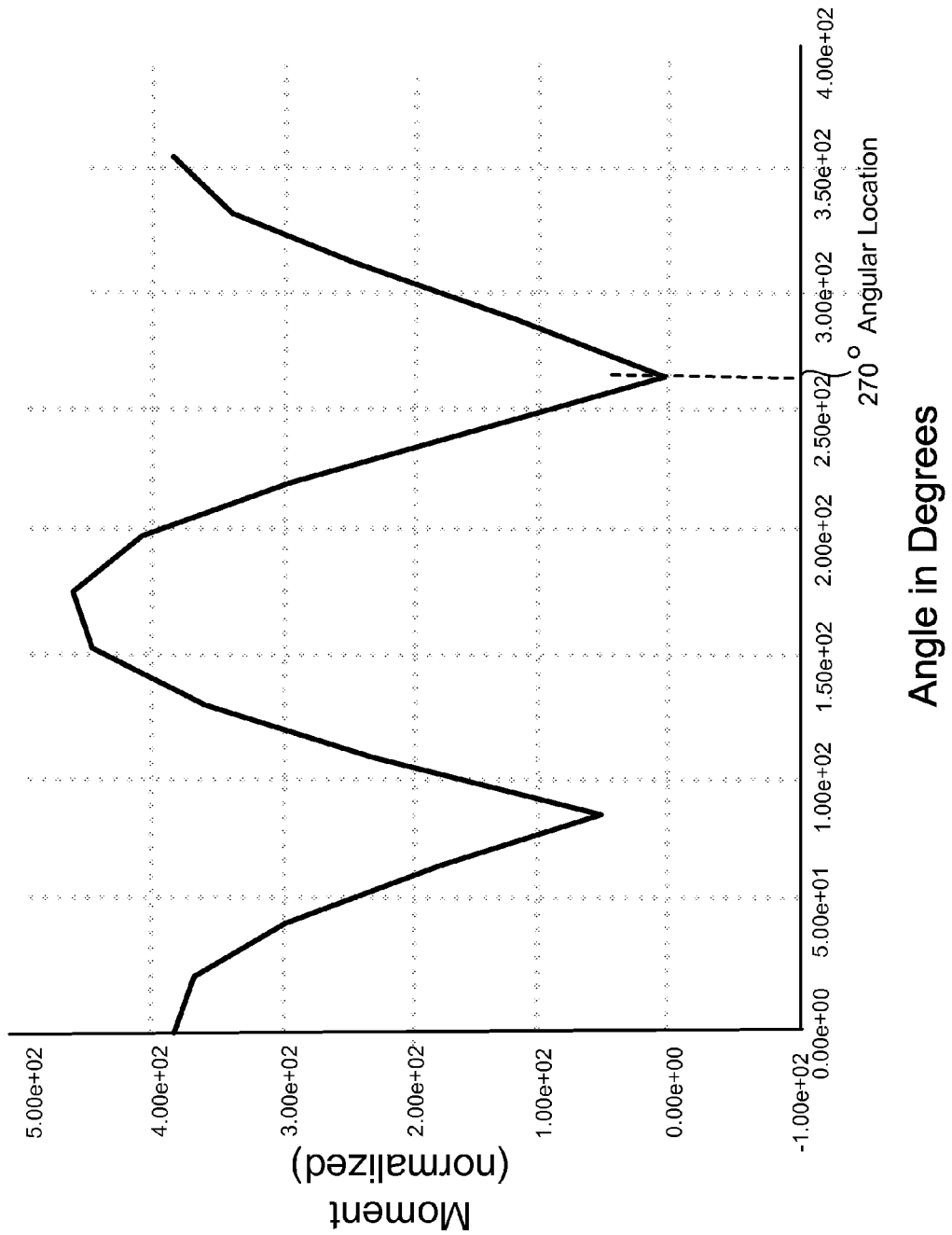

As can be seen at the FIG. 14D, the generated moment for one airfoil is not a smooth or a constant function of the rotational location. For example, the airfoil NACA0015 illustrated in FIG. 14D has a minimum at 270° with a normalized moment of −3 and a maximum moment of 465 at 90°. On the other hand, the moment generated by the blade of a conventional rotary blade turbine is the same at any angular location which results in a smoother operation. But a plurality of foils 12 in a turbine of an embodiment of the present invention ameliorates this problem. With three or more airfoils equally spaced, the net moment of the plurality of foils as a function of angular position is desirably smoother. The spacing between foils, or in other words, their number, is a function of the foil section selected, its chord, i.e., length, the radius of the paddle wheel and the fluid's physical parameters, such as density, viscosity, flow velocity, and so forth. Another factor which weights the number of foils 12 toward an odd number is the downstream effect. With an even number of foils, there is more likely to be a foil directly behind an upstream foil in the fluid flow which is likely to be disturbed at the downstream foil. An odd number of foils avoids this problem to a certain extent.

As stated earlier, the present invention may be applied to water turbines. These turbines can be placed in shallow waters with regular ocean currents or significant tidal water motions, such as found as in bays, inlets, and so forth. In deep water, the vertical axis of the turbine structure may not be able to be secured to the bottom. Further descriptions of water turbines according to the present invention are found in the above-referenced U.S. patent application Ser. No. 11/854,311.

Additional Embodiments

Figure 15A:
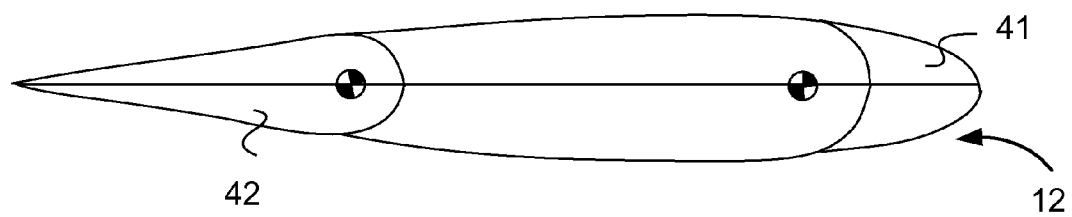
FIG. 15A shows high lift devices incorporated into a foil according to an embodiment of the present invention.
Figure 15B:
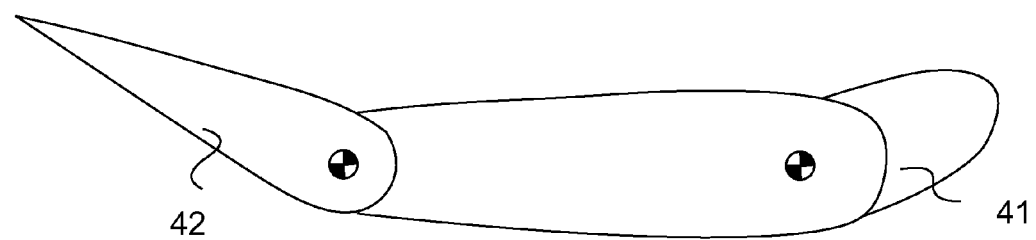
FIG. 15B illustrates how the high lift devices operate and cooperate with each other.
Figure 15B:
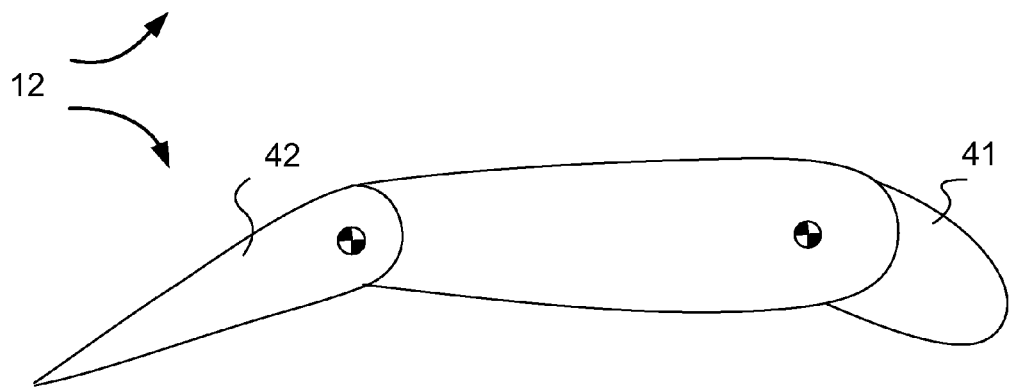

The foils 12 may include high lift devices, such as the leading edge slats or trailing edge flaps, or both, electric, hydraulic or pneumatic power is also supplied to the foils 12 for their stepper or servo motors for the high lift devices, along with their control signals. With additional complexity, turbines can have increased efficiency according to another aspect of the present invention. To further increase the lift and drag, but most importantly, the moment on the foils 12 of a turbine, flaps and/or leading edge slats can be added to the foils 12. These high lift devices shown as leading edge slats 41 and trailing edge flaps 42 in FIG. 15A are operated about the central axis 11, as illustrated FIG. 5. FIG. 15B illustrates how the slats 41 and flaps 42 operate cooperatively in both the "up" and "down" directions. The configuration in FIG. 15A is used whenever minimum drag and lift is needed, such as at the φ=270° location. The "up" and "down" slat and flap configurations in FIG. 15B are employed when the θ attack angles are negative and positive respectively. A transition from the "up" configuration in FIG. 15B to that of FIG. 15A occurs just before the foil reaches the 270° location. As the foil moves past the 270° location, a transition from the FIG. 15A configuration to the FIG. 15B 'up" configuration occurs. Another transition from the "down" configuration to the "up' configuration in FIG. 15B occurs just before the foil reaches the 90° location. These high lift devices not only increase the generated moments at all angular locations by up to a factor of two, they also completely eliminate the very small moment generated at the 270° location as shown and described with respect to FIG. 14D.

Turbine efficiency is increased and a smoother moment is generated for smoother operation. Of course, increased complexity and controls are needed for these high left devices. Each foil 12 has one or two more servo or stepper motors, or hydraulic or pneumatic drive mechanisms, depending on the number of high lift devices employed. Besides these mechanical measures, the control programs must be reworked not only for the attack angles, but also positions of the leading edge slats and trailing edge flaps, or both.

Thus the present invention provides for turbines which are highly efficient, and relatively easy to design, manufacture, install, and maintain compared to conventional wind and water turbines. Other advantages are perhaps more subtle. The smaller size of a turbine of the present invention decreases the likelihood of aesthetic objections as compared to a conventional wind turbine with equal energy conversion capacity. Furthermore, the compact appearance of the rotating foils allows birds to better avoid the turbine, a principal objection to the turbines of current windfarms.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method of operating a turbine to generate energy from a fluid flow, said turbine having a plurality of foils rotating about a central axis at a rotational velocity, each of said foils having a length and a foil axis parallel to said length and said central axis, each of said foils rotatable about its foil axis, said method comprising:

determining a velocity of said fluid flow, and angular location of each foil and said rotational velocity about said central axis; and sequentially controlling an attack angle of each foil with respect to said direction of fluid flow about said foil axis responsive to said velocity of said fluid flow, said angular location of said foil and said rotational velocity as said foil rotates about said central axis.

2. The method of claim 1 wherein said rotational velocity has a direction and said sequentially controlling step maximizes a torque by said foil about said central axis in said rotational velocity direction.

3. The method of claim 2 further comprising selecting said attack angle of each foil from a look-up table responsive to said velocity of said fluid flow, said angular location of said foil and said rotational velocity.

4. The method of claim 3 wherein for at least one angular location of a foil, said selected attack angle of said foil corresponds to a torque by said foil in a direction opposite to said rotational velocity direction.

5. The method of claim 4 wherein said torque by said foil is a minimum with respect to other attack angles at said at least one angular location.

6. The method of claim 3 wherein said selected attack angle provides a minimum foil rotation for said foil at a previous angular location.

7. The method of claim 3 further comprising repeating said determining, sequentially controlling and selecting steps.

8. The method of claim 3 further comprising
calculating a torque for said foil at different attack angles at said angular location with said velocity of said fluid flow and rotational velocity; and
selecting an attack angle for said look-up table where said torque is a maximum.

9. The method of claim 8 wherein said torque calculating step include calculating lift and drag forces on said foil.

10. The method of claim 9 wherein said lift and drag forces calculating step includes adding said fluid flow velocity and said rotational velocity to determine a relative fluid velocity on said foil.

11. A method of operating a turbine to generate energy from a fluid flow, said turbine having a plurality of foils rotating about a central axis at a rotational velocity, each of said foils having a length and a foil axis parallel to said length and said central axis, each of said foils rotatable about its foil axis, said method comprising:
determining a velocity of said fluid flow, and angular location of each foil and said rotational velocity about said central axis; and
controlling an attack angle of each foil with respect to said direction of fluid flow about said foil axis responsive to said velocity of said fluid flow, said angular location of said foil and said rotational velocity as said foil rotates about said central axis to maximize a torque by said foil about said central axis in the direction of said rotational velocity.

12. The method of claim 11 wherein controlling step is performed sequentially for each foil.

13. The method of claim 11 further comprising selecting said attack angle of each foil from a look-up table responsive to said velocity of said fluid flow, said angular location of said foil and said rotational velocity.

14. The method of claim 13 wherein for at least one angular location of a foil, said selected attack angle of said foil corresponds to a torque by said foil in a direction opposite to said rotational velocity direction.

15. The method of claim 14 wherein said torque by said foil is a minimum with respect to other attack angles at said at least one angular location.

16. The method of claim 13 wherein said selected attack angle provides a minimum foil rotation for said foil at a previous angular location.

17. The method of claim 13 further comprising repeating said determining, sequentially controlling and selecting steps.

18. The method of claim 13 further comprising
calculating a torque for said foil at different attack angles at said angular location with said velocity of said fluid flow and rotational velocity; and
selecting an attack angle for said look-up table where said torque is a maximum.

19. The method of claim 18 wherein said torque calculating step include calculating lift and drag forces on said foil.

20. The method of claim 19 wherein said lift and drag forces calculating step includes adding said fluid flow velocity and said rotational velocity to determine a relative fluid velocity on said foil.

21. A system for controlling the operations of a turbine to generate energy from a fluid flow, the system comprising said turbine having a plurality of foils rotating about a central axis at a rotational velocity, each of said foils having a length and a foil axis parallel to said length and said central axis, each of said foils rotatable about its foil axis, and a computer comprising:
an input pathway receiving input signals indicative of a velocity of said fluid flow, and angular location of each foil and said rotational velocity about said central axis; and
an output pathway sending output signals setting an attack angle of each foil with respect to said direction of fluid flow about said foil axis; and
at least one processor processing said input signals and generating said output signals responsive to said velocity of said fluid flow, said angular location of said foil and said rotational velocity as said foil rotates about said central axis from said input signals.

22. The system of claim 21 wherein said output signals maximize a torque by said foil about said central axis in the direction of said rotational velocity.

23. The system of claim 21 wherein said output signals sequentially set said attack angle of each foil.

24. The system of claim 21 wherein said at least one processor generates said output signals from a look-up table responsive to said input signals.

25. The system of claim 22 wherein said at least one processor generates said output signals for at least one angular location of each foil where said set attack angle of said foil corresponds to a torque by said foil in a direction opposite to said rotational velocity direction.

26. The system of claim 25 wherein said torque by said foil is a minimum with respect to other attack angles at said at least one angular location.

27. The system of claim 22 wherein said at least one processor generates said output signals to set said attack angle of each foil to provide a minimum foil rotation for said foil from a previous angular location.

28. A non-transitory computer-readable storage medium with an executable program stored thereon wherein the program controls the operations of a turbine to generate energy from a fluid flow, said turbine having a plurality of foils rotating about a central axis at a rotational velocity, each of said foils having a length and a foil axis parallel to said length and said central axis, each of said foils rotatable about its foil axis, by instructing at least one processor to perform the following steps:

accepting input signals indicative of a velocity of said fluid flow, and angular location of each foil and said rotational velocity about said central axis;

processing said input signals and determining an attack angle of each foil with respect to said direction of fluid flow about said foil axis from said velocity of said fluid flow, said angular location of said foil and said rotational velocity as said foil rotates about said central axis; and sending output signals to set said determined attack angle of each foil with respect to said direction of fluid flow about said foil axis.

29. The computer-readable storage medium of claim 28 wherein said processing and determining steps determine an attack angle of each foil maximizing a torque by said foil about said central axis in the direction of said rotational velocity.

30. The computer-readable storage medium of claim 29 wherein said processing and determining steps determine an attack angle of each foil where said determined attack angle of said foil corresponds to a torque by said foil in a direction opposite to said rotational velocity direction.

31. The computer-readable storage medium of claim 30 wherein said torque by said foil is a minimum with respect to other attack angles at said at least one angular location.

32. The computer-readable storage medium of claim 28 wherein said processing and determining steps determine said attack angle of each foil to provide a minimum foil rotation for said foil from a previous angular location.

\* \* \* \* \*